(12) United States Patent
England et al.

(10) Patent No.: US 10,354,337 B2
(45) Date of Patent: Jul. 16, 2019

(54) PRODUCT CONTENT SOCIAL MARKETPLACE CATALOG

(75) Inventors: Aron England, Austin, TX (US); Steven Tedjamulia, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 13/466,441

(22) Filed: May 8, 2012

(65) Prior Publication Data

US 2012/0290448 A1 Nov. 15, 2012

Related U.S. Application Data

(60) Provisional application No. 61/485,767, filed on Mar. 13, 2011.

(51) Int. Cl.
 *G06Q 30/00* (2012.01)
 *G06Q 50/00* (2012.01)
 *G06Q 30/02* (2012.01)
 *G06Q 30/06* (2012.01)

(52) U.S. Cl.
 CPC ......... *G06Q 50/01* (2013.01); *G06Q 30/0282* (2013.01); *G06Q 30/0631* (2013.01)

(58) Field of Classification Search
 CPC ....... G06Q 30/00; G06Q 30/0641; G06Q 3/06
 USPC ............................................... 705/26.1, 27.1
 See application file for complete search history.

(56) References Cited

U.S. PATENT DOCUMENTS

| 8,060,828 B2* | 11/2011 | Griffith | G06Q 30/02 |
| | | | 715/738 |
| 8,271,878 B2* | 9/2012 | Kane | G06Q 30/02 |
| | | | 715/733 |
| 2002/0188509 A1* | 12/2002 | Ariff | B01J 23/6562 |
| | | | 705/14.25 |
| 2009/0222317 A1* | 9/2009 | Allen | G06Q 30/0201 |
| | | | 705/7.29 |
| 2010/0114739 A1* | 5/2010 | Johnston | G06Q 30/06 |
| | | | 705/26.1 |
| 2011/0225027 A1* | 9/2011 | Herrera Schuvab | |
| | | | G06Q 30/0241 |
| | | | 705/14.4 |
| 2012/0130863 A1* | 5/2012 | Tedjamulia | G06Q 30/0224 |
| | | | 705/27.1 |

\* cited by examiner

*Primary Examiner* — Mila Airapetian
(74) *Attorney, Agent, or Firm* — Terrile, Cannatti & Chambers; Stephen A. Terrile

(57) ABSTRACT

A method and system are disclosed for managing catalog resources within a social commerce environment. Users are referred by a plurality of affiliates to a social commerce marketplace system. Once referred, the users are presented with a customized social commerce storefront that is associated with an individual affiliate. Each of the customized social commerce storefronts comprises a micro catalog of purchasable products, which is a subset of a master catalog comprising a set of available products. Social data associated with the user and catalog data associated with the purchasable products is processed to generate product catalog data to the user, which is then provided to the user. The user reviews the social commerce content and selects individual purchasable products for purchase.

20 Claims, 30 Drawing Sheets

PRODUCT CONTENT SOCIAL MARKETPLACE CATALOG

CROSS-REFERENCE TO RELATED APPLICATION

This application claims the benefit under 35 U.S.C. § 119(e) of U.S. Provisional Application No. 61/485,767, filed May 13, 2011, entitled "Social Marketplace." U.S. Provisional Application No. 61/485,767 includes exemplary systems and methods and is incorporated by reference in its entirety.

BACKGROUND OF THE INVENTION

Field of the Invention

Embodiments of the invention relate generally to information handling systems. More specifically, embodiments of the invention provide a method and system for managing catalog resources within a social commerce environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. One known aspect of electronic commerce is affiliate networks, which allow online merchants to reach a larger audience through participation in various affiliate programs. Typically, potential customers are referred to the merchant's website from an affiliate's web site, which receives a share of any resulting sale as compensation for the referral. Various affiliate network services and benefits generally include referral tracking, reporting tools, payment processing, and access to a large base of participants. Over time, affiliate networks have made progress in simplifying the process of registering affiliate participants fore or more merchant affiliate programs. However, affiliates still face integration challenges when attempting to provide their users a customized subset of the merchant's website.

In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular for enabling customer feedback, and by extension, have likewise evolved into a viable marketing channel for vendors. This new marketing channel, sometimes referred to as "social marketing," has proven to not only have a higher customer retention rate than traditional marketing channels, but to also provide higher demand generation "lift."

Currently, social marketing is typically limited to providing a link from a social media environment to the home page of a merchant's website, where a referred user can then search for a recommended product. In some cases, the user may be referred to a predetermined product page or listing. However, no known ability is currently available for a social marketer to refer a user to a customized subset of a merchant's products. Furthermore, social marketers generally lack real-time integration with the merchant's site. As a result, they typically have to rely upon the merchant's traditional methods of referral tracking, reporting, accounting and payment processing. Moreover, there is a lack of simplified integration between merchant websites, affiliate networks, and social media environments, which pose challenges in realizing the promise of social marketing.

SUMMARY OF THE INVENTION

A method and system are disclosed for managing catalog resources within a social commerce environment. In various embodiments, users are referred by a plurality of affiliates to a social commerce marketplace system. Once referred, the users are presented with a customized social commerce storefront that is associated with an individual affiliate. Each of the customized social commerce storefronts comprises a micro catalog of purchasable products, which is a subset of a master catalog comprising a set of available products.

In these and other embodiments, social data associated with the user and catalog data associated with the purchasable products is processed to generate product catalog data to the user, which is then provided to the user. In one embodiment, the product catalog data corresponds to a subset of the purchasable products. In another embodiment, the product catalog data is provided to the user within a user interface (UI) window of a widget. In yet another embodiment, the user's social data is processed to generate social graph data, which in turn is processed to generate keyword and theme data. The keyword and theme data is then processed to identify a subset of the product catalog data, which is then provided to the user.

In one embodiment, the product catalog data is associated with a social commerce campaign. In another embodiment, the product catalog data is associated with various types of social commerce content such as product reviews, ratings and user blogs. In this embodiment, the social commerce content is concurrently provided with the product catalog data to the user. In this and other embodiments, the user reviews the social commerce content and selects individual purchasable products for purchase

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system are disclosed for managing catalog resources within a social commerce environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
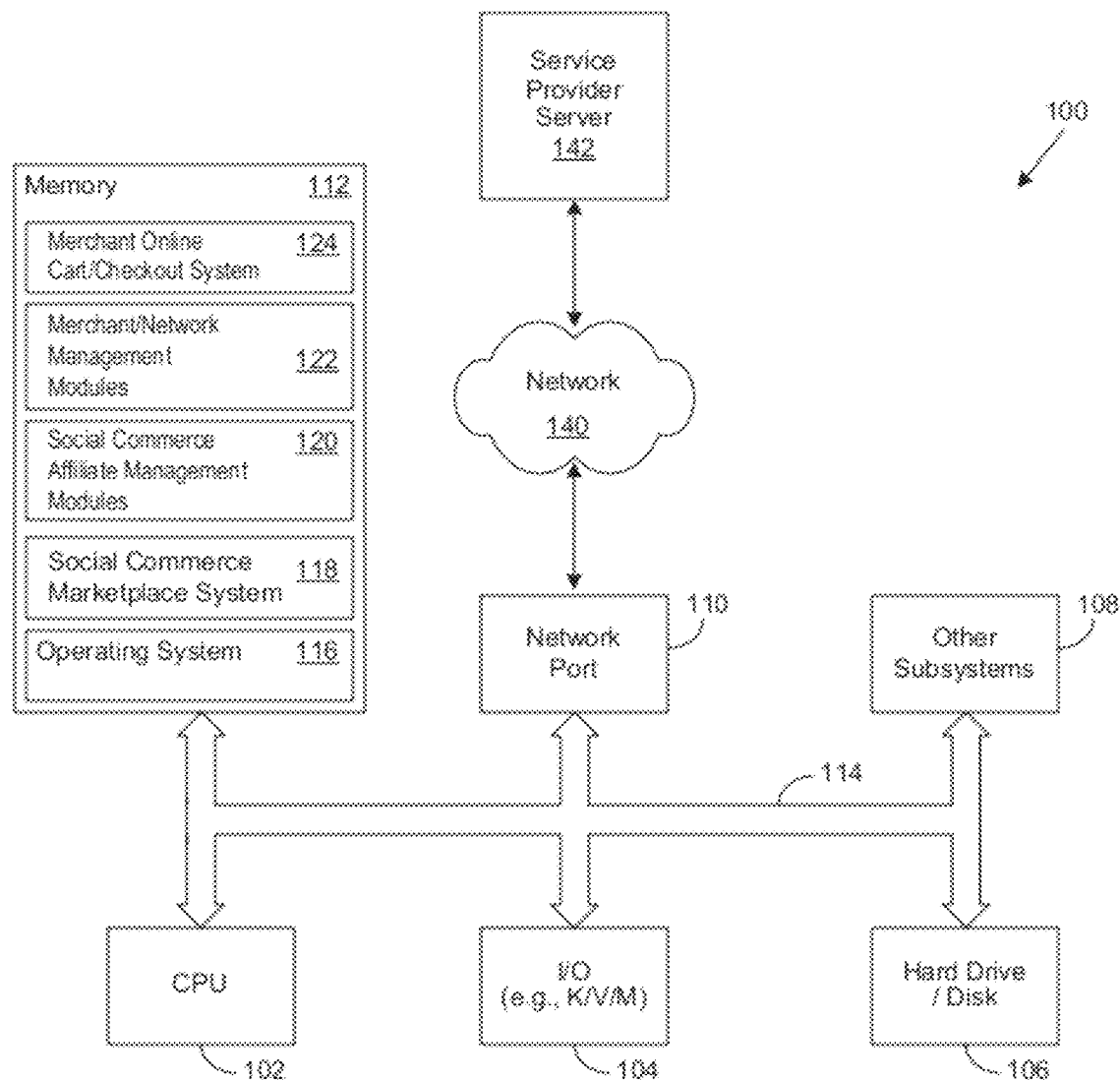
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social commerce marketplace system 118, a plurality of social commerce affiliate management modules 120, a plurality of merchant/network management modules 122, and a merchant online cart/checkout system 124. In one embodiment, the information handling system 100 is able to download the social commerce marketplace system 118, the plurality of social commerce affiliate management modules 120, the plurality of merchant/network management modules 122, and the merchant online cart/checkout system 124 from the service provider server 142. In another embodiment, the social commerce marketplace system 118, the plurality of social commerce affiliate management modules 120, the plurality of merchant/network management modules 122, and the merchant online cart/checkout system 124 is provided as a service from the service provider server 142.

Figure 2:
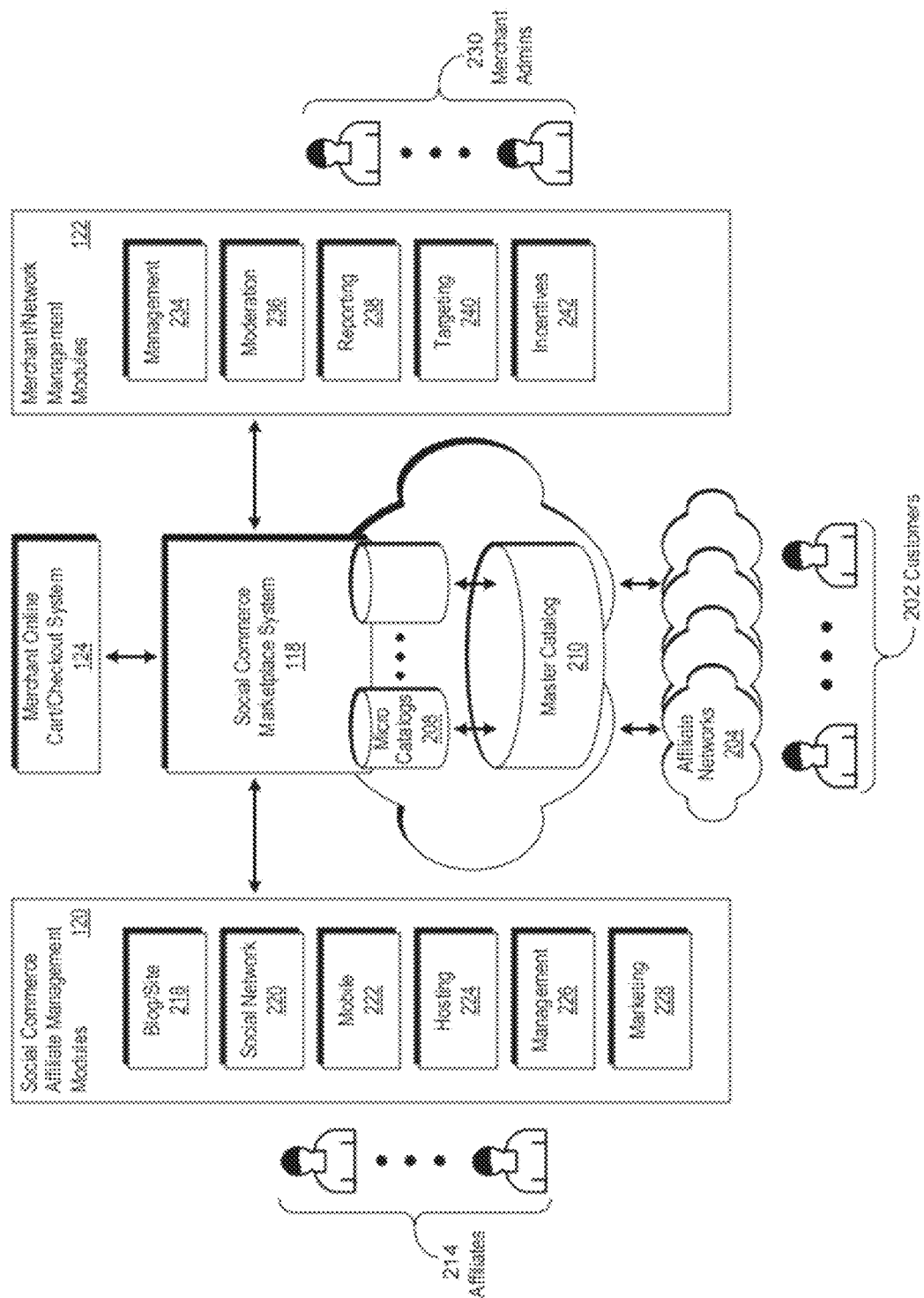
FIG. 2 is a simplified block diagram showing the implementation of a social commerce marketing system.

FIG. 2 is a simplified block diagram showing the implementation of a social commerce marketing system in accordance with an embodiment of the invention. In this embodiment, a social commerce marketplace system 118 is implemented with a plurality of social commerce affiliate management modules 120, a plurality of merchant/network management modules 122, a merchant online cart/checkout system 124. In these and other embodiments, the plurality of social commerce affiliate management modules 120 are accessed and used by a plurality of affiliates 214. Likewise, the plurality of social commerce affiliate management modules 120 comprises a blog/site management module 218, a social network management module 222, and a mobile delivery management module 222. The plurality of social commerce affiliate management modules 120 likewise comprises a hosting management module 224, a social commerce management module 226, and a marketing management module 228.

In one embodiment, the blog/site management module 214 is used by the plurality of affiliates 214 to manage the posting and linking of social commerce content from the affiliate's online blog or website to the social commerce marketplace system 118. In another embodiment, the social network management module 220 is used by the plurality of affiliates 214 to manage the linkages between one or more social media environments and the social commerce marketplace system 118. In yet another embodiment, the mobile delivery management module 222 is used by the plurality of affiliates 214 to manage the delivery of social commerce content to a mobile device. In still another embodiment, the hosting management module 224 is used by the plurality of affiliates 214 to manage the hosting environment(s) of a customized social commerce storefront associated with the affiliate and the merchant. In one embodiment, the social commerce management module 226 is used by the plurality of affiliates 214 to perform social commerce management operations as described in greater detail herein. In yet another embodiment, the marketing management module 228 is used by the plurality of affiliates 214 to perform social commerce marketing operations, as likewise described in greater detail herein.

In various embodiments, the plurality of merchant/network management modules 122 are accessed and used by a plurality of merchant administrators 230. In these and other embodiments, the plurality of merchant/network management modules 122 comprises a merchant/network management module 234, and a social commerce moderation module 236. Likewise, the plurality of merchant/network management modules 122 comprises a social commerce reporting module 238, a targeting module 240, and an incentives module 242.

In one embodiment, the merchant/network management module is used by is used by the plurality of merchant administrators 230 to manage a plurality of affiliate social commerce storefronts and a plurality of affiliate networks 204. In another embodiment, the moderation management module 236 is used by the plurality of merchant administrators 230 to monitor and moderate social commerce content and associated social media content related to the plurality of affiliates 214. In yet another embodiment, the social commerce reporting module 238 is used by the plurality of merchant administrators 230 to administer and deliver a plurality of social commerce reports as described in greater detail herein. In one embodiment, the targeting module 240 is used by the plurality of merchant administrators 230 to perform targeted advertising and promotion operations familiar to those of skill in the art and described in greater detail herein. In another embodiment, the incentives module 242 is used by the plurality of merchant administrators 230 to manage the accounting and payment of incentives to the plurality of affiliates 214 as compensation for referring customers to the merchant. As described in greater detail herein, the plurality of social commerce affiliate management modules 120 and the plurality of merchant/network management modules 122 may include additional modules and the foregoing is not intended to limit the spirit, scope or intent of the invention.

Referring now to FIG. 2, a plurality of users, such as customers 202, are referred by a plurality of affiliate networks 204 to the social commerce marketplace system 118 as described in greater detail. Once referred, the customers 202 are presented with a customized social commerce storefront that is associated with an individual affiliate of the plurality of affiliates 214 and the merchant. In various embodiments, each of the customized social commerce storefronts comprises a micro catalog 208 of purchasable products, which is a subset of a master catalog 210 comprising a set of available products. In these and other embodiments, and as likewise described in greater detail herein, the customized social commerce storefronts comprise social commerce content related to the purchasable products. In these various embodiments, the customers 202 review the social commerce content and select individual purchasable products for purchase. Once selected, an online purchase transaction familiar to skilled practitioners of the art is completed with the merchant online cart/checkout system 124.

Figure 3:
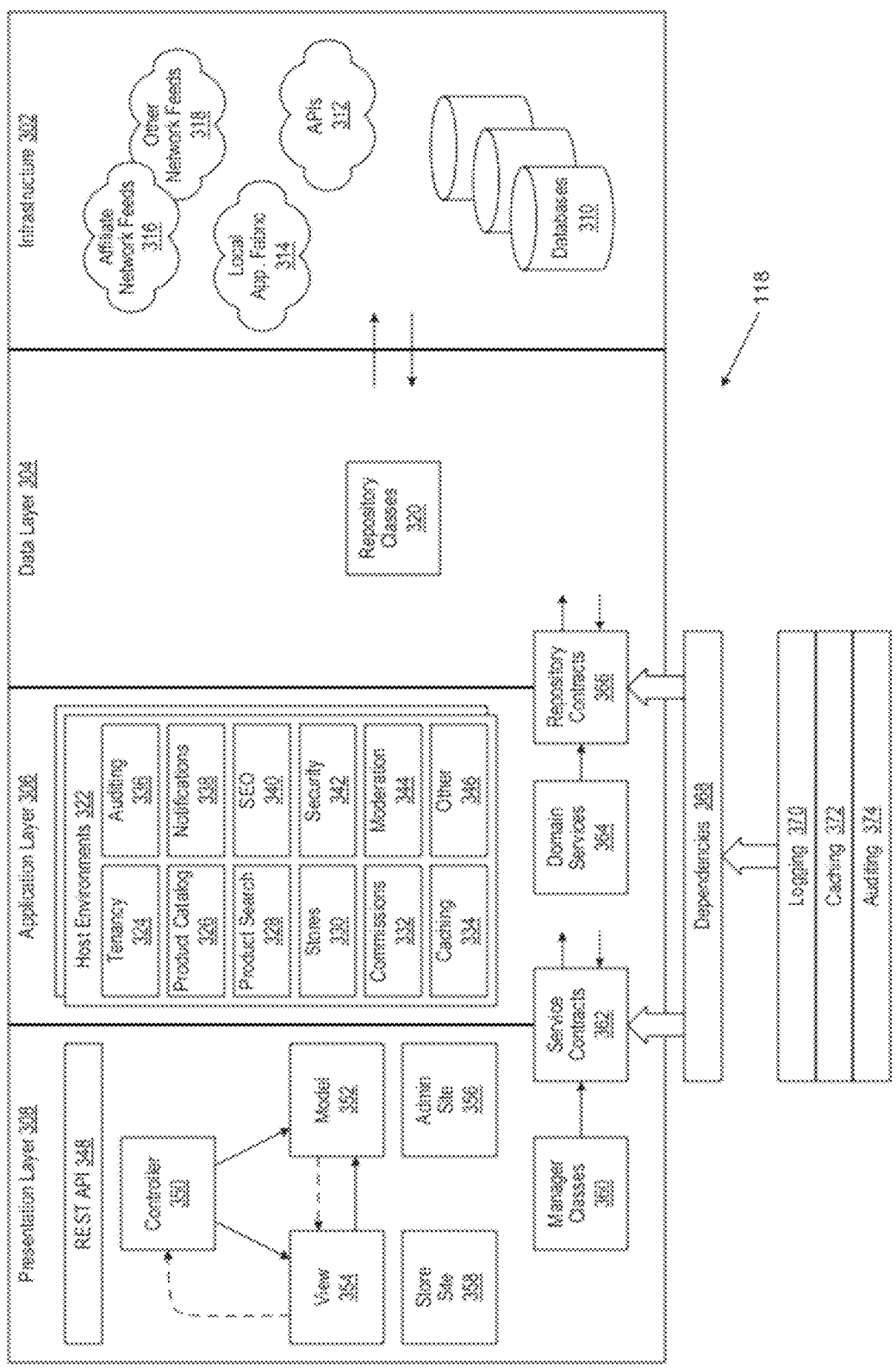
FIG. 3 is a simplified block diagram showing a high-level architecture of a social commerce marketplace system.

FIG. 3 is a simplified block diagram showing a high-level architecture of a social commerce marketplace system as implemented in accordance with an embodiment of the invention. In this embodiment, the architecture a social commerce marketplace system 118 comprises infrastructure 302, data 304, application 306 and presentation 308 layers. As shown in FIG. 3, the infrastructure 302 layer comprises feeds from affiliate networks 316, as described in greater detail herein, and other networks 318, such as advertising networks known to those of skill in the art. The infrastructure 302 layer likewise comprises a local application fabric 314, as likewise known to those of skill in the art, a plurality of application programming interfaces (APIs) 312, and a plurality of databases 310, as described in greater detail herein. The data 304 layer likewise comprises repository classes 320, which are used for the exchange of data between the data 304 and infrastructure 302 layers.

Likewise, the application 306 layer comprises host environments 322, which in turn comprise a tenancy management module 324, a product catalog management module 326, and a product search module 328. The host environments 322 likewise comprise a stores management module 330, a commission management module 332, and a caching module 334. Likewise, the host environments 322 comprise an auditing module 336, a notifications module 338, a search engine optimization (SEO) module 340, a security management module 342, a moderation management module 344, and other modules 346 as described in greater detail herein.

In one embodiment, the tenancy management module 324 is used by merchant administrators to manage a plurality of affiliate tenancies in a virtual environment. In another embodiment, the product catalog management module 326 is used to manage available products in a master catalog and purchasable products, which are subsets of the available products, in micro catalogs as described in greater detail herein. In yet another embodiment, the product search module 328 is used with various other modules in the initiation, provisioning, and management of affiliate storefronts. In still another embodiment, the commission management module 332 is used to track, account, and pay commissions to affiliates as compensation for referring customers to the merchant. In one embodiment, the caching module 334 is used to cache social commerce content and other data related to conducting social commerce operations.

In another embodiment, the auditing module 336 is used to audit social commerce transactions that are performed within the social commerce marketplace system. In yet another embodiment, the notifications module 338 is use to manage notifications to affiliates as well as users referred by the affiliates to the social commerce marketplace system. In still another embodiment, the SEO module 340 is used to perform SEO operations known to skilled practitioners of the art. In this embodiment, the SEO operations, as described in greater detail herein, are performed to optimize the identification of a purchasable product according to the search terms used by either an affiliate or a user of a social media environment. In one embodiment, the security module is used to maintain the security of the social commerce marketplace system. In another embodiment, the moderation module 344 is used to monitor and moderate social commerce content and associated social media content related to a plurality of affiliates. In yet another embodiment, the other modules 346 comprise additional modules, as described in greater detail herein, that operate within the host environments 322.

In various embodiments, the presentation 308 layer comprises a Representational State Transfer (REST) application program interface (API) 348 known to skilled practitioners of the art. In these and other embodiments, the presentation 308 layer likewise comprises a controller module 350 a presentation model 352, a presentation view 354, and a plurality of administration 356 and affiliate storefront 358 sites. In these various embodiments, the controller module 350 interacts with the presentation model 354 and presentation view 354, which likewise interact with each other, to present different aspects of the plurality of administration 356 and affiliate storefront 358 sites. Likewise, the presentation view 354 module provides feedback to the controller module 350.

Referring now to FIG. 3, the presentation 308 layer comprises manager classes 350 and the application 306 layer comprises domain services. The manager classes 360 provide presentation layer data to the service contracts module 362, which is then used for the management of the domain service 364. In turn, the domain services 364 provide application layer data to the repository contracts module 366, where it is used for the management of the repository classes 320. Likewise, the service contracts module 362 and the repository contracts module 366 are managed and bounded by a dependencies module 368. In turn, the dependencies module 368 is managed with the logging 370, caching 372, and auditing 374 management modules.

Figure 4A:
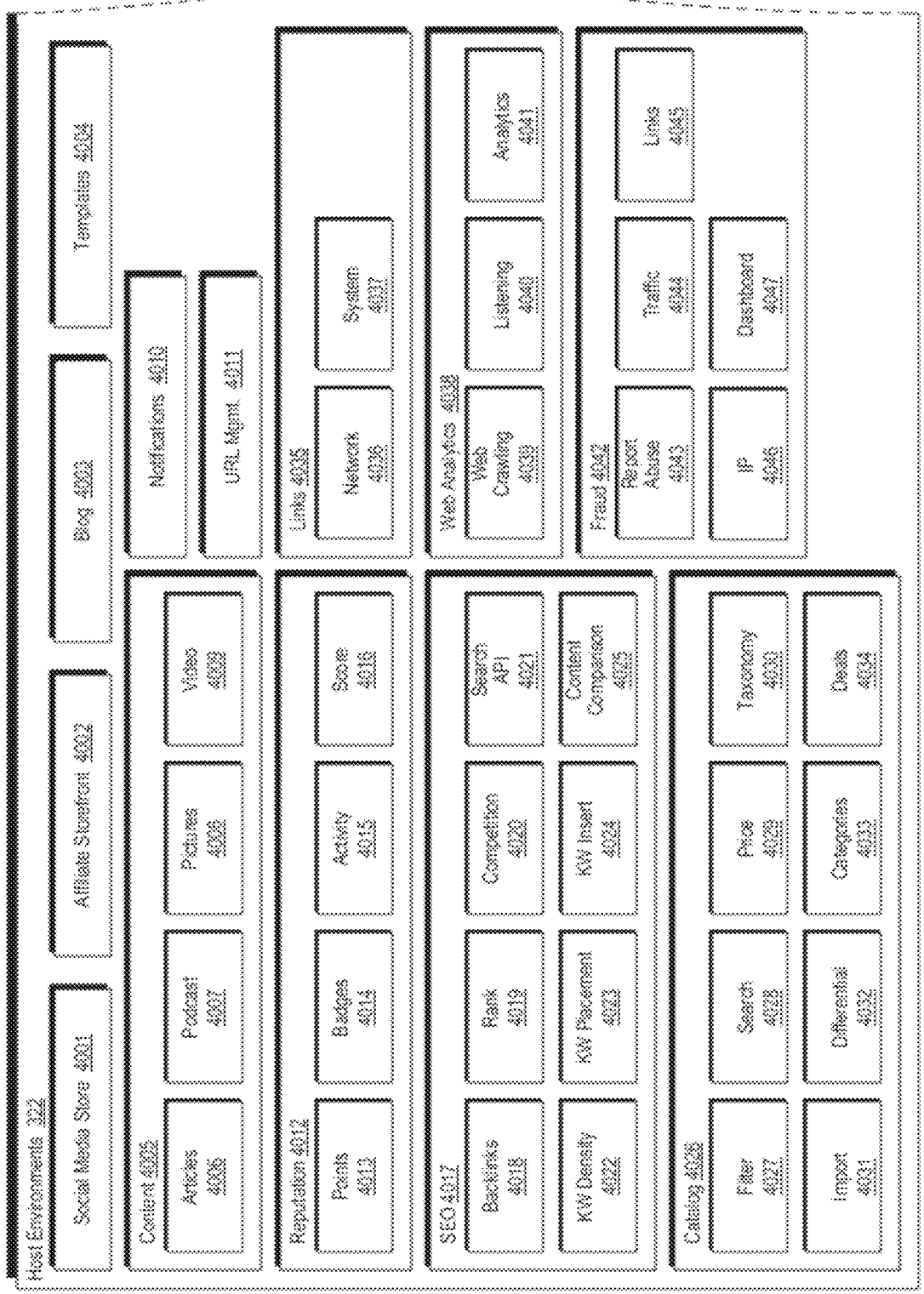
FIGS. 4a-c are a simplified block diagram showing a plurality of social commerce modules implemented within a plurality of host environments.
Figure 4B:
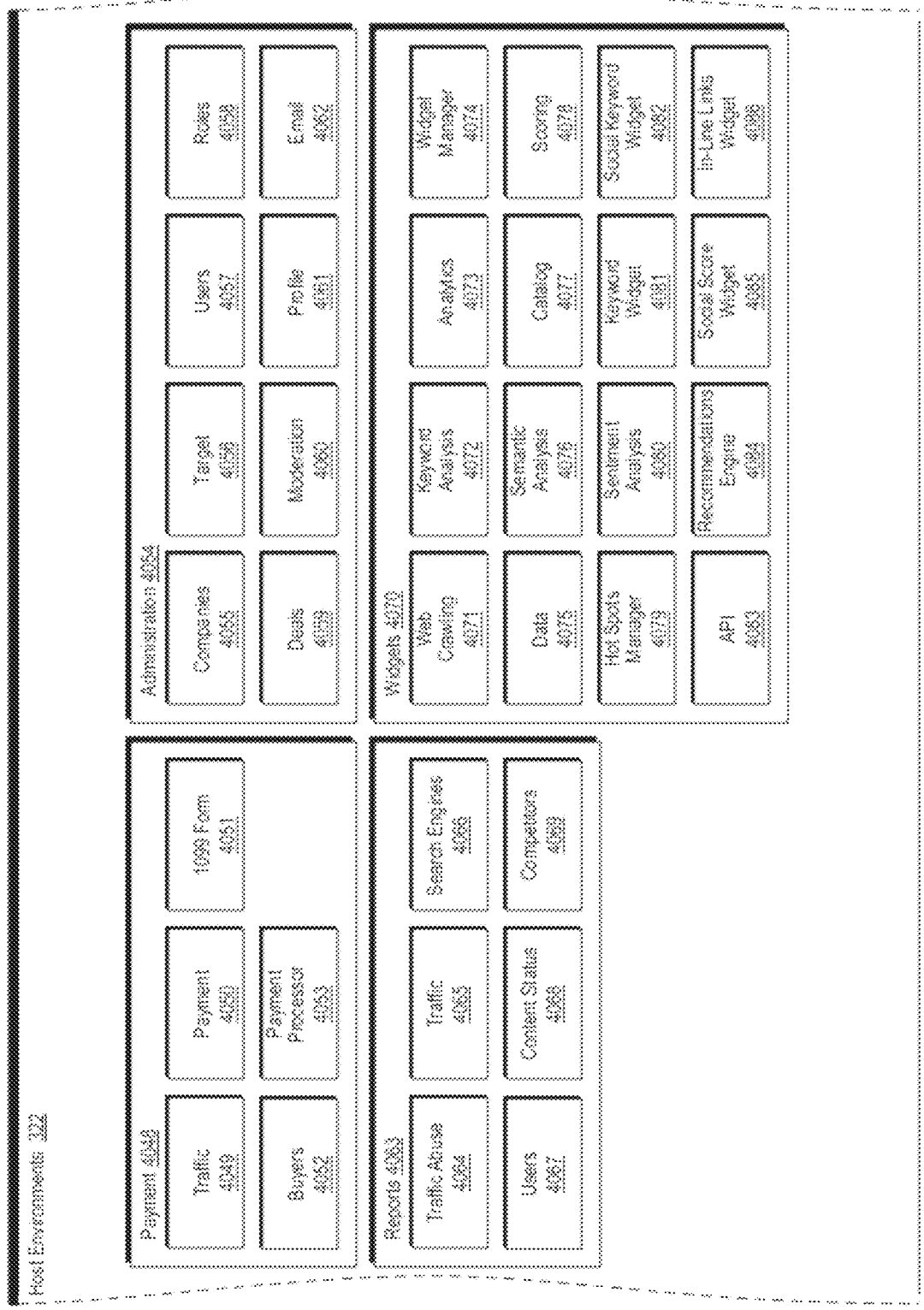
Figure 4C:
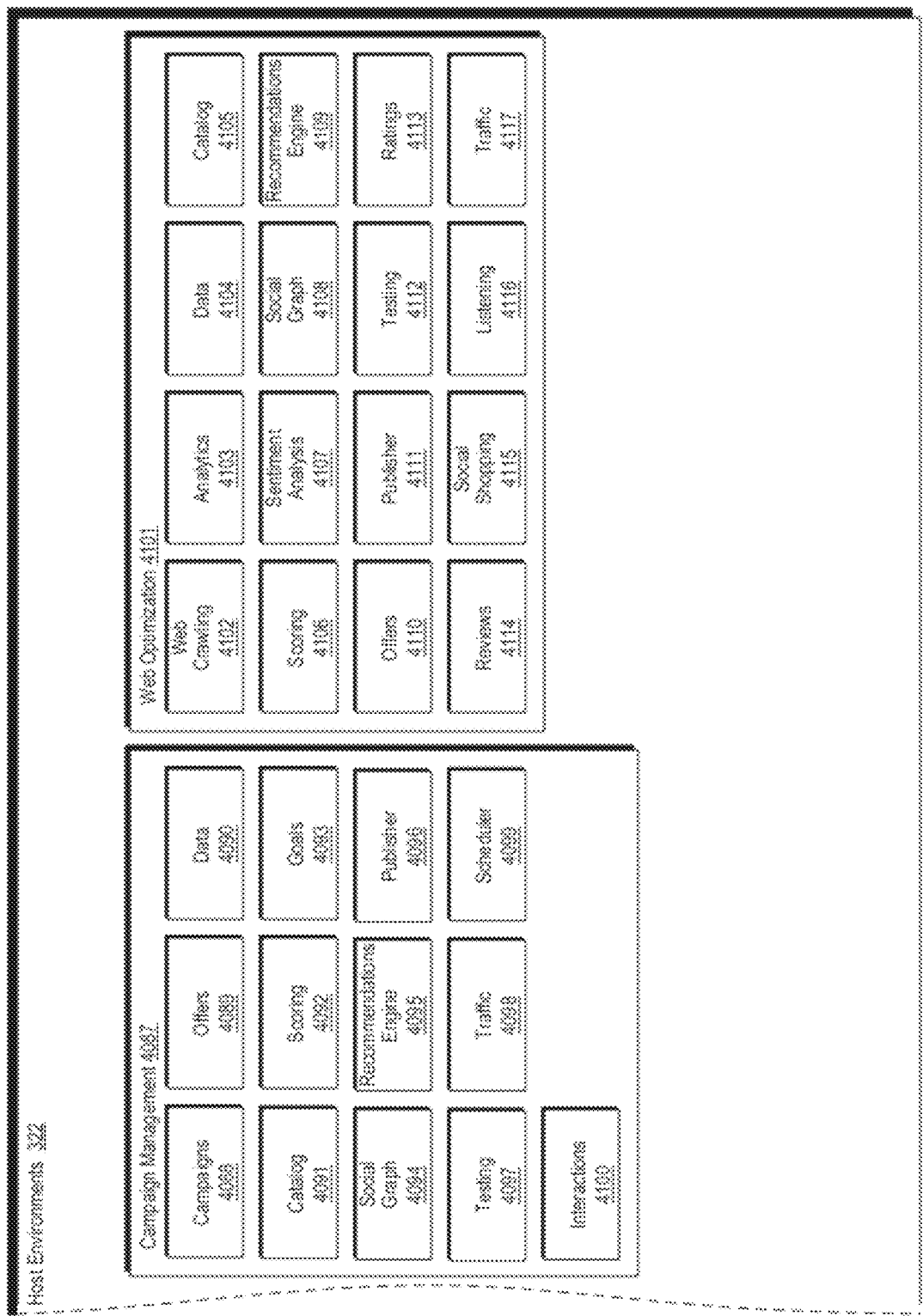

FIGS. 4a-c show a simplified block diagram of a plurality of social commerce modules implemented within a plurality of host environments in accordance with an embodiment of the invention. In this embodiment, the host environments 322 comprise social media store 4001, affiliate storefront 4002, blog 4003, templates 4004, content 4006, notifications 4010, uniform resource locator (URL) 4011, reputation 4012, and search engine optimization (SEO) 4017 management modules. Likewise, the host environments 322 comprise catalog 4026, links 4035, web analytics 4038, fraud 4042, payment 4048, administration 4054, reports 4063, widget 4070, campaign management 4087, and web optimization 4101 management modules.

In one embodiment, the social media store 4001 management module is used to manage a social commerce storefront that is associated with an affiliate's presence and activities within a social media environment. In another embodiment, the affiliate storefront 4002 management module is used to manage a social commerce storefront that is associated with an affiliate's web site or online blog. In yet another embodiment, the blog 4003 management module is used to manage an affiliates blog activities as it relates to social commerce activities, processes and operations as described in greater detail herein. In still another embodiment, as likewise described in greater detail herein, the templates 4004 management module is used for the automated configuration of social commerce storefront pages. In one embodiment, the notifications 4010 management module is used for the management of notifications to affiliates and users associated with affiliates, such as users of an affiliate's online social commerce presence. In various embodiments, the affiliate's online presence may comprise a blog, a website, or a community of interest or conversation thread in a social media environment. In another embodiment, the URL 4011 management module is used to manage URL links between the host environments 322 and the affiliate's various online social commerce presences.

In yet another embodiment, the content 4005 management module further comprises articles 4006, podcast 4007, pictures 4008, and video 4009 management sub-modules. In this and other embodiments, the articles 4006, podcast 4007, pictures 4008, and video 4009 management sub-modules are used by affiliates to manage their respective, associated content as it relates to social commerce operations. In still another embodiment, the reputation 4012 management module comprises points 4013, badges 4014, activity 4015, and score 4016 management sub-modules. In this and other embodiments, the reputation 4012 management module comprises points 4013, badges 4014, activity 4015, and score 4016 management sub-modules are used by the merchant to manage reputation data associated with affiliates. As used herein, reputation data refers to data associated with social commerce activities performed by an affiliate. As an example, an affiliate may receive points from a merchant for each item of social commerce content they product. Likewise, badges may be awarded upon achievement of various point tiers or frequency of activity. Likewise, each social commerce content item may receive a score that is associated with the achievement of the points and badges. It will be appreciated that many such examples are possible and the foregoing is not intended to limit the spirit, scope, or intent of the invention.

In one embodiment, the SEO management 4017 module comprises backlinks 4018, rank 4019, competition 4020, search application program interface (API) 4021, keyword density 4022, keyword placement 4023, keyword insertion 4024, and content comparison 4025 management sub-modules. In this and other embodiments the various sub-modules of the SEO management 4017 module are used by affiliates and the merchants to perform SEO operations familiar to those of skill in the art. As an example, the backlinks 4018 management sub-module may be used to determine prior web site locations that a user has visited prior to being referred to an affiliate's social commerce storefront. Likewise, the rank 4019 management sub-module may be used to determine the search engine rank assigned to the affiliate's social commerce storefront as well as the individual search engine ranking of the search terms that resulted in the referral. As another example, the competition 4020 management sub-module may be used by the merchant to rank the search engine popularity of their competitors, or alternatively, the frequency that a competitor's web site is returned as a result of a search by a user of a social media environment. Likewise, the search API 4021 management sub-module may be used by the merchant and affiliates alike to gain access to various search engines in order to receive search metadata. As yet another example, the keyword density 4022, placement 4023, and insertion 4024 management sub-modules may likewise be used by the merchant and the affiliates to optimize searches through the use of predetermined keywords within related social commerce content. As still another example, the content comparison 4025 sub-module may be used to compare various items of social commerce content to determine which items perform better than others during SEO operations.

In another embodiment, the catalog 4026 management module comprises filter 4027, search 4028, price 4029, taxonomy 4030, import 4031, differential 4032, categories 4033, and deals 4034 management sub-modules. In this and other embodiments, the filter 4027, search 4028, price 4029, taxonomy 4030, import 4031, differential 4032, categories 4033, and deals 4034 management sub-modules are used by the affiliate for managing their social commerce storefronts. For example, the filter 4027, search 4028, price 4029, differential 4032, deals 4034, and import 4031 management sub-modules may be used individually, or in combination, to identify and populate a set of purchasable products within a micro catalog from a set of available products contained in a master catalog. Likewise, the taxonomy 4030 and categories 4033 management sub-modules may be used to understand the interrelationship of various purchasable products and how they are categorized within the affiliate's social commerce storefront. It will be appreciated that many such examples are possible and the foregoing is not intended to limit the spirit, scope, or intent of the invention.

In yet another embodiment, the links 4035 management module comprises network 4036 and system 4037 management sub-modules, which are used to manage the linkages between the various systems, modules, and sub-modules of the social commerce marketplace system and various affiliate and advertising networks. In still another embodiment, the web analytics 4038 module comprises web crawling 4039, listening 4040, and analytics 4041 management sub-modules. In this and other embodiments the web crawling 4039, listening 4040, and analytics 4041 management sub-modules are used by the merchant to perform web analytics operations familiar to skilled practitioners of the art. As an example, the merchant may use the web crawling 4039 management sub-module to perform web crawling operations to discover conversation threads associated with its products. Once discovered, the listening 4040 management sub-module may be used to monitor the conversations threads, which are then analyzed with the analytics 4041 management sub-module to determine their relevance and possible effect on social commerce operations. Those of skill in the art will be knowledgeable of many such examples. Accordingly, the foregoing is not intended to limit the spirit, scope, or intent of the invention.

In one embodiment, the fraud 4042 management module comprises an abuse reporting 4043, traffic 4044, links 4045, Internet Protocol (IP) 4046, and dashboard 4047 management sub-modules. In this and other embodiments, the abuse reporting 4043, traffic 4044, links 4045, Internet Protocol (IP) 4046, and dashboard 4047 management sub-modules are used by the merchant to identify, mitigate, and prevent fraudulent behavior within the social commerce market place system. As an example, the traffic 4044, links 4045, and IP 4046 management sub-modules may be used to identify the source of fraudulent behavior. Once identified, it may be reported by the abuse reporting 4043 management sub-module and then displayed for review within a user interface by the dashboard 4047 sub-module.

In another embodiment, the payment 4048 module comprises a traffic 4049, payment 4050, 1099 Form 4051, buyers 4052, and payment processor 4053 management sub-modules. In this and other embodiments, the traffic 4149, payment 4150, 1099 4151, buyers 4152, and payment processor 4153, management sub-modules are used by the merchant for the management of payment to affiliates. As an example, the buyers 4052 and traffic 4049 management sub-modules may be used to identify individual buyers and the traffic they generate at an affiliate's social commerce storefront. In turn, the payment 4050 and payment processor 4053 sub-modules may be used to track the payments made by the buyers, which are then processed by various payment processors. Likewise, the same sub-modules may be used to track commission payments made by the merchant to individual affiliates. The output of those sub-modules may then be processed by the 1099 Form 4051 sub-module for managing reporting of the commission payments to the affiliate to the Internal Revenue Service (IRS).

In yet another embodiment, the administration 4054 module comprises companies 4055, target 4056, users 4057, roles 4058, deals 4059, moderation 4060, profile 4061, and email 4062 management sub-modules. In this embodiment, the companies 4055, target 4056, users 4057, roles 4058, deals 4059, moderation 4060, profile 4061, and email 4062 management sub-modules are used by the merchant to administer the various users of the social commerce marketplace system. As an example, the target 4056 management sub-module may be used, individually or in conjunction with, the target 4056, users 4057, profile 4061, and roles 4058 management sub-modules to identify specific users of a social media environment. Once identified, their social media interactions may be monitored by the moderation 4060 management sub-module, and in turn the email 4062 and deals 4059 management sub-modules may be used individually, or in combination, to target predetermined users.

In still another embodiment, the reports module 4063 comprises traffic abuse 4064, traffic 4065, search engines 4066, users 4067, content status 4068, and competitors 4069 reporting sub-modules. In this embodiment, the traffic abuse 4064, traffic 4065, search engines 4066, users 4067, content status 4068, and competitors 4069 reporting sub-modules are used by the merchant to generate various reports related to social commerce operations, which in turn may be provided to an affiliate. As an example, the content status 4068 reporting sub-module may report on the status of various items of social commerce content and the search engines 4066 reporting sub-module may report on the search results it generates. In turn, the traffic reporting 4065 sub-module may be used to report on the social commerce traffic resulting from the search results and the users 4067 reporting sub-module may provide reports related to the various users referred to the social commerce site. Likewise, the traffic abuse reporting sub-module 4064 may be used to report on various traffic abuses related to the social commerce marketplace system, while the competitors 4069 reporting sub-module may provide reports related to competitive activity from competitors.

In various embodiments, the widgets module 4070 may comprise web crawling 4071, keyword analysis 4072, analytics 4073, widget manager 4074, data 4075, semantic analysis 4076, catalog management 4077, scoring 4078, hot spots manager 4079, sentiment analysis 4080, keyword widget 4081, social keyword widget 4082, API 4083, recommendations engine 4084, social score widget 4085 and in-line links widget 4086 sub-modules. In one embodiment, the web-crawling 4071 sub-module is implemented to perform web crawling operations to discover keywords within webpages. In another embodiment, the keyword analysis 4072 sub-module is implemented to determine related keywords, competition of keywords, search frequency of keywords, and locality of keywords. In yet another embodiment, the analytics 4073 sub-module is implemented to provide the utilization of widgets by visitors. In still another embodiment, the widget manager 4074 sub-module is implemented to provide a set of user interfaces to configure and publish a widget. In various embodiments, the widget manager 4074 sub-module is implemented to provide templates that comprise user interface (UI) themes and interactions that determine the end-user experience. In these and other embodiments, the widget manager 4074 sub-module comprises a wizard that provides a multi-step process to configure the widget. In one embodiment, the widget manager 4074 sub-module comprises a dashboard providing a UI to access the wizard, embed associated programming code, and generate related reports.

In one embodiment, the data 4075 sub-module is implemented to process social graph, user, and catalog data. In another embodiment, the semantic analysis 4076 sub-module is implemented to semantically extract keywords, topics, people and places from strings of text. In another embodiment, the catalog 4076 sub-module is implemented with a widget to process catalog data. In yet another embodiment, the hot spots manager 4077 sub-module comprises a set of user interfaces to configure and publish images and videos that contain hot spots. In still another embodiment, the sentiment analysis 4078 sub-module is implemented to extract positive, neutral and negative tone from strings of text. In one embodiment, the page keyword widget 4079 sub-module is implemented to provide a widget that automatically matches catalog products to the context of keywords extracted from a webpage. In another embodiment, the social keyword widget 4080 sub-module is implemented to provide a widget that automatically matches catalog products to a user's context by matching keywords and themes from their social graph. In yet another embodiment, the API 4081 sub-module is implemented to provide an API between a widget and various operating environments. In still another embodiment, the recommendation engine 4082 sub-module is implemented to automatically select or recommend objects that best match the user's context based on a set of algorithms. In one embodiment, the social score widget 4083 sub-module is implemented to provide a widget that dynamically presents catalog products and discounts according to a user's social score. In yet another embodiment, the in-line links widget 4084 sub-module is implemented to provide a widget that automatically creates in-line hyperlinks within text strings based on keywords that match objects from a catalog. It will be appreciated that many such embodiments are possible and the foregoing is not intended to limit the spirit, scope or intent of the invention.

In various embodiments, the campaign management module 4087 comprises campaigns 4088, offers 4089, data 4090, catalog 4091, scoring 4092, goals 4093, social graph 4094, recommendations engine 4095, publisher 4096, testing 4097, traffic 4098, scheduler 4099, and interactions management sub-modules.

In one embodiment, the campaigns 4088 management sub-module is used to create, schedule and manage on-line marketing campaigns that drive traffic to an affiliate's websites, blogs and social media networks. In another embodiment, the campaigns 4088 management sub-module is used to create an email marketing campaign. In yet another embodiment, the campaigns 4088 management sub-module is used to create dynamic landing web pages using behavioral targeting approaches to determine which content, layout and calls-to-action to present to each visitor. In still another embodiment, the campaigns 4088 management sub-module is used to post offers to users accounts (e.g., "walls") within social networking sites such as Facebook®. In another embodiment, the campaigns 4088 management sub-module is used to post content and offers via social sites like Twitter®. In yet another embodiment, the campaigns 4088 management sub-module is used to select the landing page that campaign recipients will visit when they click-through an offer (e.g., by an email, tweet, Facebook® post, etc.).

In another embodiment, the offers 4089 management sub-module is used to select predetermined products and services from one or more catalogs 4091. The selected products are then presented to a campaign recipient. In yet another embodiment, the data 4090 management sub-module is used to select the delivery medium of a campaign, such as email, search marketing, display ad, or social media. In yet another embodiment, the data 4090 management sub-module is used to select the content and creative assets that are displayed to users that view or otherwise respond to the campaign. In yet another embodiment, the offers 4089 management sub-module is used to select the delivery endpoints (e.g., Facebook®, Twitter®, etc.) that the campaign will be transported through to reach the intended user(s).

In yet another embodiment, the data 4090 management sub-module is used to select the list of users that are targeted to receive a predetermined campaign. In still another embodiment, the data 4090 management sub-module is used to select the segment of users that are targeted to receive a targeted campaign. In yet another embodiment, the data 4090 management sub-module is used to store and manage the data collected from the recipients of the campaign via the interactions 4100 management sub-module. In yet another embodiment, the data 4090 management sub-module is used to store and manage the versions of landing pages (e.g., their respective content, layout, style, etc.) that are used presented to users. In yet another embodiment, the data 4090 management sub-module is used to store and manage user's social graph information.

In still another embodiment, the catalog 4091 management sub-module is used to select which products to include in the campaign's offers. In yet another embodiment, the catalog 4091 management sub-module is used to select which merchants to include in the campaign's offers.

In one embodiment, the scoring 4092 management sub-module is used to select a list of targeted campaign recipients by using various algorithms to calculate the economic value of each recipient, which is then ranked. In yet another embodiment the scoring 4092 management sub-module is used to select a list of targeted recipients by using various algorithms to calculate the social influence of each recipient, which is then ranked to determine the prioritized order of which recipients receive the campaign. In still another embodiment, the scoring 4092 management sub-module is used to select a list of targeted recipients by using various algorithms to calculate the conversion uplift of similar segments and similar campaigns within a predetermined group of accounts, which are then rank ordered.

In another embodiment, the goals 4093 management sub-module is used to create the success criteria that campaigns will be measured against. In yet another embodiment, the goals 4093 management sub-module is used to measure the response to the campaign against predefined business goals (e.g., success criteria) to determine the success of the campaign. In still another embodiment, the goals 4093 management sub-module is used to measure the interactions rates and success criteria for a specific channel (e.g., a delivery medium such as Facebook®, email, etc.). In yet another embodiment, the goals 4093 management sub-module is used compare a campaign's success rate(s) against averages across a predetermined group of accounts. In yet another embodiment, the goals 4093 management sub-module is used to suggest combinations of campaigns and offers that are likely to meet the success criteria based upon a predetermined group of accounts. In various embodiments, the business goals and success criteria may include email click through rates, landing page conversion rates, traffic volume to a predetermined landing page, mentions and re-tweets, purchases, average order value, revenue, leads, and so forth. It will be appreciated that many such business goals and success criteria are possible and the foregoing is not intended to limit the spirit or scope of the invention.

In yet another embodiment, the social graph 4094 management sub-module is used to pull a campaign recipient's data from one or more social networks (e.g., Facebook®, Twitter®, Google+®) via APIs such that it can be used by the scoring 4092 management sub-module to determine which users should receive the campaign.

In still another embodiment, the recommendation engine 4095 sub-module utilizes algorithms to dynamically select which offers provided by the offers 4089 management sub-module (e.g., products, etc.) each campaign recipient should be presented within their respective landing pages to increase the likelihood of uplift. In yet another embodiment, the recommendation engine 4095 sub-module utilizes algorithms to select which data provided by the data 4090 management sub-module (e.g., landing page layout, content, etc.) each campaign recipient should be presented within their respective landing pages to increase the likelihood of uplift. In still another embodiment, the recommendation engine 4095 sub-module is used to suggest what campaigns and offers an account should consider using to meet success criteria goals provided by the goals 4093 management sub-module.

In one embodiment, the publisher 4096 management sub-module is used to select when campaign interactions provided by the interactions 4100 management sub-module are to be made available to campaign recipients. In yet another embodiment, the publisher 4096 management sub-module is used with the recommendation engine 4095 management sub-module to select a publishing schedule of interactions provided by the interactions 4100 management sub-module that would result in a higher likelihood of meeting or exceeding goals success criteria goals provided by the goals 4093 management sub-module. In yet another embodiment, the publisher 4096 management sub-module is used to select which landing pages will be published to the Internet and made available to campaign recipients according to a schedule provided by the scheduler 4099 management sub-module.

In another embodiment, the testing 4097 management sub-module is used to randomly present different combinations of interactions, offers and data to campaign recipients in order to determine which combination results in the highest attainment of predetermined goals. In yet another embodiment, the testing 4097 management sub-module is used to present different combinations of interactions, offers and data to predetermined segments of campaign recipients to determine which combination results in the highest attainment of predetermined goals. In another embodiment, the testing 4097 management sub-module provides users the ability to change or select predetermined versions of content elements within regions of published webpage to test from within the context of the webpage using standard web browsers. In yet another embodiment, the testing 4097 management sub-module is used to select a statistical confidence interval used by the social commerce marketplace system to determine a winning combination of interactions, offers and data.

In yet another embodiment, the traffic 4098 management sub-module is used in conjunction with the testing 4097 management sub-module to select the amount and frequency of traffic to direct to a predetermined combination of interactions, offers and data to control the presentation of campaigns to visitors.

In still another embodiment, the scheduler 4099 management sub-module is used to determine when recipients will be exposed to a campaign and the frequency of follow up interactions. In another embodiment, the scheduler 4099 management sub-module is used to determine when landing pages will be published and unpublished for a predetermined campaign. In yet another embodiment, the scheduler 4099 management sub-module is used to determine when offers will be published and unpublished for a predetermined campaign.

In one embodiment, the interactions 4100 management sub-module is implemented as an instance of the user interface (UI) within a predetermined channel for a predetermined campaign recipient (e.g., an offer in combination with an end point). In one embodiment, the interactions 4100 management sub-module is used to record individual recipient engagements with a campaign to capture data (e.g., when, which endpoint, did the user click through an offer, did the user convert, etc.) that the goals 4093 management sub-module uses to determine whether the business goals have been met or exceeded.

In various embodiments, the web optimization module 4101 comprises web crawling 4102, analytics 4103, data 4104, catalog 4105, scoring 4106, sentiment analysis 4107, social graph 4108, recommendations engine 4109, offers 4110, publisher 4111, testing 4112, ratings 4113, reviews 4114, social shopping 4115, listening 4116, and traffic management sub-modules.

In one embodiment, the web crawling 4102 management sub-module is used to capture a website's page content, layouts, creative assets and calls-to-action. In another embodiment, the web crawling 4102 management sub-module is used with the recommendation engine 4109 and testing 4112 management sub-modules to recommend content to use within webpages that have been statistically proven to increase uplift for the source site. In yet another embodiment, the web crawling 4102 management sub-module is used to crawl the Internet and social network sites for product ratings and reviews.

In another embodiment, the analytics 4103 management sub-module is used to capture the visitor click-stream data that is used by the recommendations engine 4109 management sub-module to determine which content, layout, and calls-to-action are most likely to result in increased visitor engagement (e.g., amount of time on-site, page views, etc.) and conversions.

In yet another embodiment, the data 4101 management sub-module is used to retrieve prior purchase history information for a visitor, which in turn is used by the recommendation engine 4109 management sub-module to determine which content, layout, and calls-to-action are most likely to result in increased visitor engagement (e.g., time on-site, page views, etc.) and a conversion event for the current site visitor or other visitors with similar characteristics. In yet another embodiment, the data 4101 management sub-module is used to retrieve current temporal information and end user device information for a visitor, which in turn is used by the recommendation engine 4109 management sub-module to determine which content, layout, and calls-to-action are most likely to result in increased visitor engagement (e.g., time on-site, page views, etc.) and a conversion event for the current site visitor or other visitors with similar characteristics.

In still another embodiment, the catalog 4105 management sub-module is used to select which products and offers to present to a visitor as determined by the recommendation engine 4109 management sub-module that are most likely to result in increased visitor engagement (e.g., time on-site, page views, etc.) or a conversion event.

In one embodiment, the scoring 4106 management sub-module is used to determine the social influence of a visitor such that the recommendations engine 4109 management sub-module is able to determine which content (e.g., products and offers), layouts, and calls-to-action to present to the user that is most likely to result in increased visitor engagement (time on site, page views), or a conversion event for a calculated social influence score. In yet another embodiment, the scoring 4106 management sub-module is used with the sentiment analysis 4107 management sub-module to calculate trends of topics and products that are then provided as recommendations to users to include within their websites to capitalize upon the trend.

In another embodiment, the sentiment analysis 4107 management sub-module is used to analyze the tone of a website, page, blog, content or social post to determine the positive, neutral or negative tonality about the topics within the content. The sentiment analysis 4107 management sub-module then aggregates tonality analysis across multiple sites, social posts, social networks, etc. to identify market trends for products and services. In turn, the recommendation engine 4109 management sub-module recommends products to merchandize in order to capitalize upon the market trends. In another embodiment, the sentiment analysis 4107 management sub-module is used to identify customer support, product and service satisfaction issues for the website owner to remedy. In another embodiment, the sentiment analysis 4107 management sub-module is used with the social graph 4108 management sub-module to determine positive topics of interest for a user and their network of users, which are then used to target predetermined content and products that match the users' topics of interest.

In yet another embodiment, the social graph 4108 management sub-module is used to retrieve visitor social data and social relationship data such that the recommendation engine 4109 management sub-module can determine which content (e.g., products and offers), layouts, and calls-to-action to present to the user that are most likely to result in increased visitor engagement (e.g., time on-site, page views, etc.) or a conversion event based upon the users social graph information. It another embodiment, the social graph 4108 management sub-module processes a user's social graph data to match it with other users that have similar social graph characteristics.

In still another embodiment, the recommendation engine 4109 management sub-module is used to determine which content (e.g., products and offers), layouts, and calls-to-action to present to the user that are most likely to result in increased visitor engagement (e.g., time on-site, page views, etc.) or a conversion event. In this and other embodiments, the recommendation engine 4109 management sub-module uses inputs from the analytics 4013, data 4104, catalog 4105, social graph 4108, and scoring 4106 management sub-modules as inputs into an algorithm for the afore-mentioned operations.

In one embodiment, the offers 4110 management sub-module is used to select which products and offers to present to a user that are most likely to result in increased engagement (e.g., time on-site and conversions). In another embodiment, the offers 4110 management sub-module is used to match the highest rated products as found by the web crawler 4102 management sub-module with products from the catalog 4105 management sub-module to present to a user.

In another embodiment, the publisher 4111 management sub-module is used to schedule the automatic publishing and un-publishing of web pages. In yet another embodiment, the publisher 4111 management sub-module is used to schedule the automatic publishing and un-publishing of products provided by the catalog 4105 management sub-module within predetermined web pages. In still another embodiment, the publisher 4111 management sub-module is used to schedule the automatic publishing and un-publishing of content variations within predetermined webpages to keep the website fresh.

In yet another embodiment, the testing 4112 management sub-module is used to randomly present different combinations of data, page layout, content and visual style within webpages to visitors to determine which combination results in the highest level of engagement (e.g., time on-site or conversions). In another embodiment, the testing 4112 management sub-module provides users the ability to change or select predetermined versions of content elements within regions of a published webpage in order to use standard web browsers to directly test from within the context of the webpage. In yet another embodiment, the testing 4112 management sub-module is used to select the statistical confidence interval the social commerce marketplace system used to determine a winning combination of data, page layout, content and visual style to automatically publish the winning version to the webpage.

In still another embodiment, the ratings 4113 management sub-module is used to dynamically select which product ratings format to display to the user that is most likely to result in higher engagement for the visitor. In another embodiment, the ratings 4113 management sub-module is used to select which products to display within a web page based upon the correlation between the products ratings and user click-through rates. In yet another embodiment, the ratings 4113 management sub-module is used to identify trends in product ratings to recommend when to add or remove a predetermined product or class of products from a website to optimize engagement.

In one embodiment, the reviews 4114 management sub-module is used to dynamically select which product reviews format to display to the user that is most likely to result in higher engagement for the visitor. In another embodiment, the reviews 4114 management sub-module is used to select which products to display within a web page based upon the correlation between the products reviews and user click-through rates. In yet another embodiment, the reviews 4114 management sub-module is used to identify trends in product reviews to recommend when to add or remove a predetermined product or class of products from a website to optimize engagement. The reviews 4114 management sub-module uses the sentiment analysis 4107 management sub-module to determine positive, neutral or negative sentiment towards a specific product. In still another embodiment, the reviews 4114 management sub-module uses the predictive scoring 4106 management sub-module to determine the direction and magnitude of market trends for each product managed by the catalog 4105 management sub-module.

In another embodiment, the social shopping 4115 management sub-module implements JavaScript® into third party website pages to display user interface (UI) controls next to products that list users in their social network that have indicated in their social network (e.g., Facebook®) that they own the product. In another embodiment, the social shopping 4115 management sub-module shows which users within their social network have visited the webpage and when. In another embodiment, the social shopping 4115 management sub-module displays a list of individuals within their social network that have used the same referring search keyword term that the user used to reach the webpage. In yet another embodiment, the social shopping 4115 management sub-module lists individuals, and their associated content, that have expressed an opinion about the product within their social networks (e.g., ratings, reviews, mentions, etc.).

In yet another embodiment, the listening 4116 management sub-module is used with the crawling 4102 management sub-module to find specific information on websites and within social network sites matching products with a catalog managed by the catalog 4105 management sub-module. In another embodiment, the listening 4116 management sub-module provides users with content ideas, content fragments, and user interface designs to consider using within their websites, based upon content collected by the web crawler 4102 management sub-module. In yet another embodiment, the listening 4116 management sub-module searches for social network mentions (e.g., Twitter® tweets or Facebook® wall posts) and provides them to the sentiment analysis 4107 management sub-module to identify positive content that the recommendations engine 4109 management sub-module uses to recommend which products to merchandize.

In still another embodiment, the traffic 4098 management sub-module is used in conjunction with testing 4112 management sub-module to select the amount and frequency of traffic to direct to a specific combination of data, layout, content and calls-to-action to control the presentation of webpage user interfaces to visitors.

Figure 5:
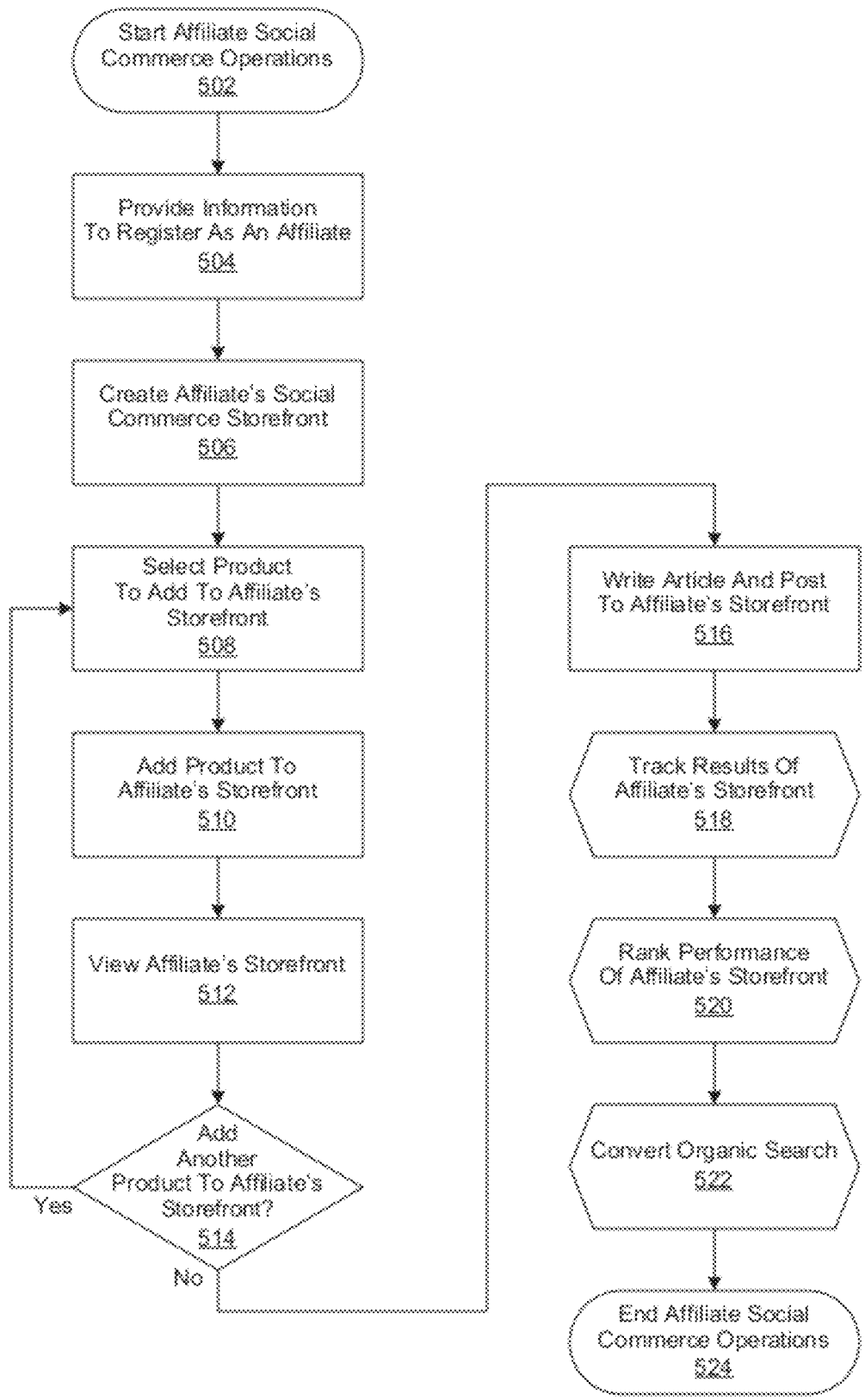
FIG. 5 is a generalized flow chart of social commerce initiation operations performed on behalf of an affiliate.

FIG. 5 is a generalized flow chart of social commerce initiation operations performed on behalf of an affiliate in accordance with an embodiment of the invention. In this embodiment, affiliate social commerce operations are begun in step 502, followed by a candidate affiliate providing information to a merchant in step 504 to register as an affiliate. The merchant then uses the provided information to create a social commerce storefront for the affiliate in step 506. The affiliate then proceeds to select a product to add to their social commerce storefront in step 508. In various embodiments, the product is selected from a plurality of available products contained in a master catalog. The selected product is then added to the affiliate's social commerce storefront in step 510. In various embodiments, a selected product becomes a purchasable product once it is added to the affiliate's social commerce storefront.

The affiliate then views their social commerce storefront in step 512, followed by a determination being made in step 514 whether to add an additional product. If so, then the process is continued, proceeding with step 508. Otherwise, an article related to one or more of the purchasable products is written in step 516 and then posted to the affiliate's social commerce storefront. The ongoing sales results of the affiliate's social commerce storefront is then tracked in step 518, as well as the ongoing ranking of its performance relative to other affiliate social commerce storefronts in step 520. Ongoing conversion of organic searches resulting in sale is likewise tracked in step 522, followed by affiliate social commerce initiation operations being ended in step 524.

Figure 6A:
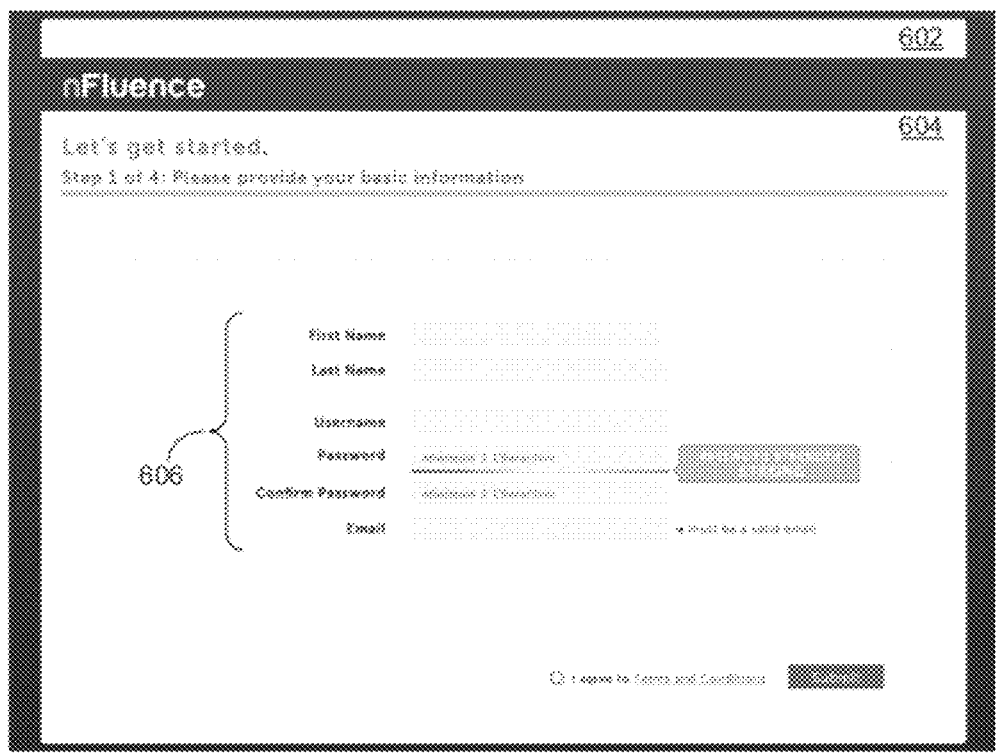
FIGS. 6a-d are generalized depictions of social commerce initiation operations performed on behalf of an affiliate within a plurality of user interface windows.
Figure 6B:
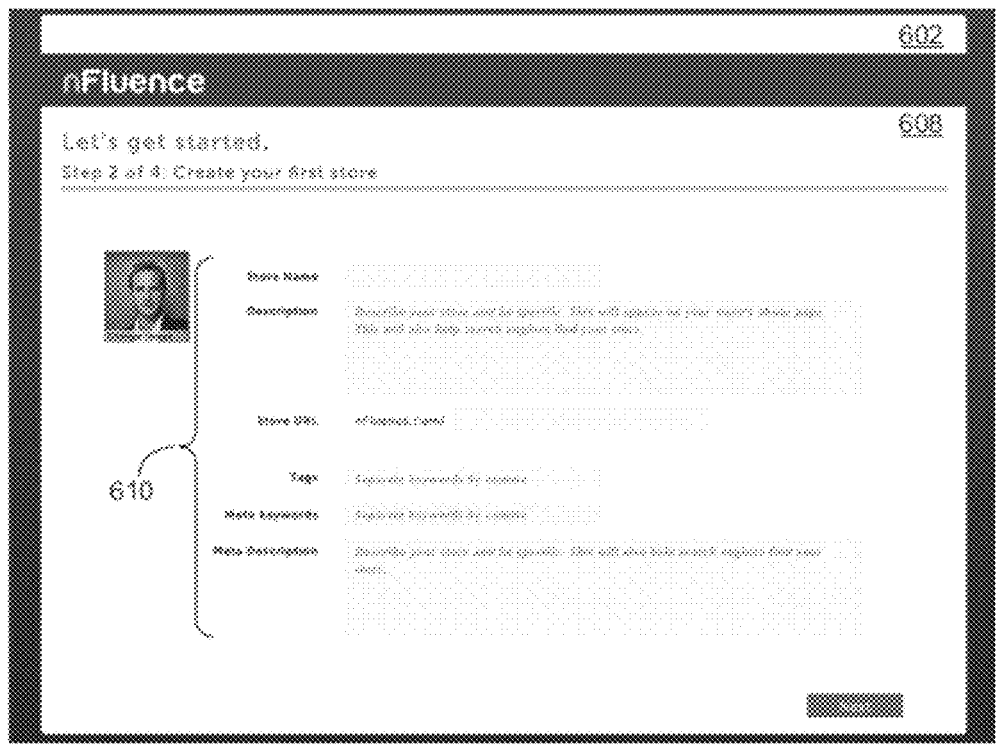
Figure 6C:
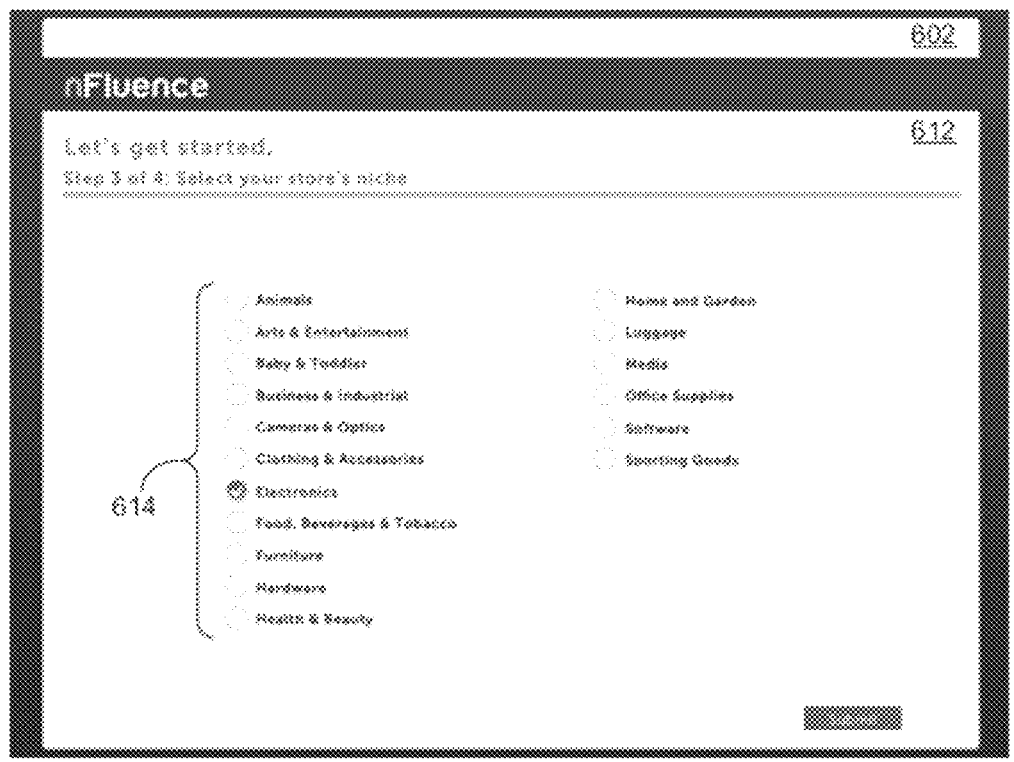
Figure 6D:
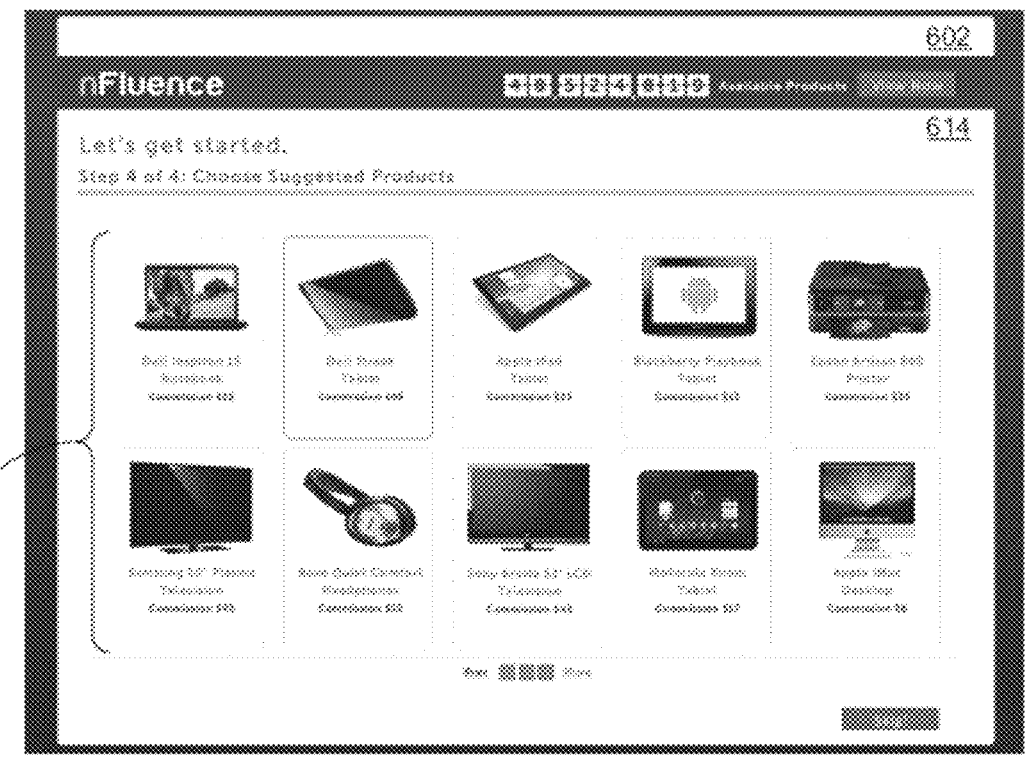

FIGS. 6a-d are generalized depictions of social commerce initiation operations performed on behalf of an affiliate within a plurality of user interface windows in accordance with an embodiment of the invention. In this embodiment, a social commerce storefront management module, as described in greater detail herein, is implemented within a window 604 of a user interface (UI) 602. As shown in FIG. 6a, the UI window 604 comprises data entry fields 606 for a candidate affiliate to provide information to initiate the creation of a social commerce storefront. Referring now to FIG. 6b, the affiliate then provides additional information 610 associated with their social commerce storefront. As shown in FIG. 6c, the affiliate selects the category 614 of their social commerce storefront, and as likewise shown in FIG. 6d, selects products 614 to be displayed for purchase within their social commerce storefront.

Figure 7:
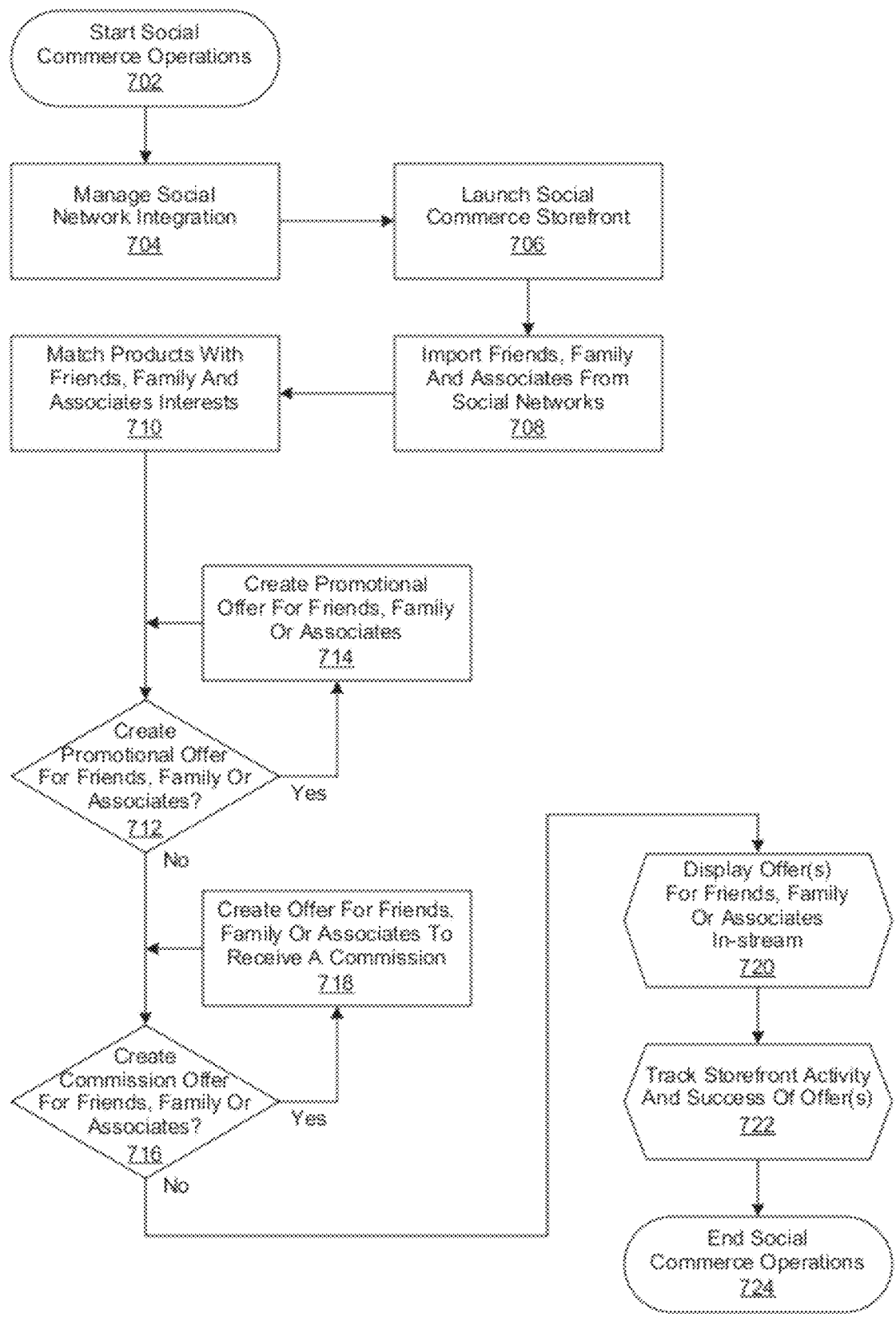
FIG. 7 is a generalized flow chart of the performance of social commerce operations.

FIG. 7 is a generalized flow chart of the performance of social commerce operations as implemented in accordance with an embodiment of the invention. In this embodiment, social commerce operations are begun in step 702, followed by the affiliate managing the integration of the social commerce storefront in step 704 with a social media environment, such as a social network. In various embodiments, the integration may be with an affiliate web site or blog. The affiliate then launches the social commerce storefront in step 706, followed by the importation of friends, family, and associates from one or more social media environments (e.g., a social network) in step 708. The friends, family and associates are then matched with products that are appropriate to their interests in step 710, followed by a determination in step 712 whether to create a promotional offer for them. If so, then a promotional offer is created in step 714 and the process is continued, proceeding with step 712. Otherwise, a determination is made in step 716 whether the affiliate will offer to provide an offer to pay a commission to the friends, family or associates in return for referrals. If so, then then a commission offer is prepared in step 718 and the process is continued, proceeding with step 716. Otherwise the promotion offers(s), the commission offer(s), or both, are displayed to the friends, family and associates in-line within the social media environment in step 720. Ongoing activity at the affiliate's social commerce storefront, and the corresponding success of the offer(s), is tracked in step 722 and social commerce operations are then ended in step 724.

Figure 8:
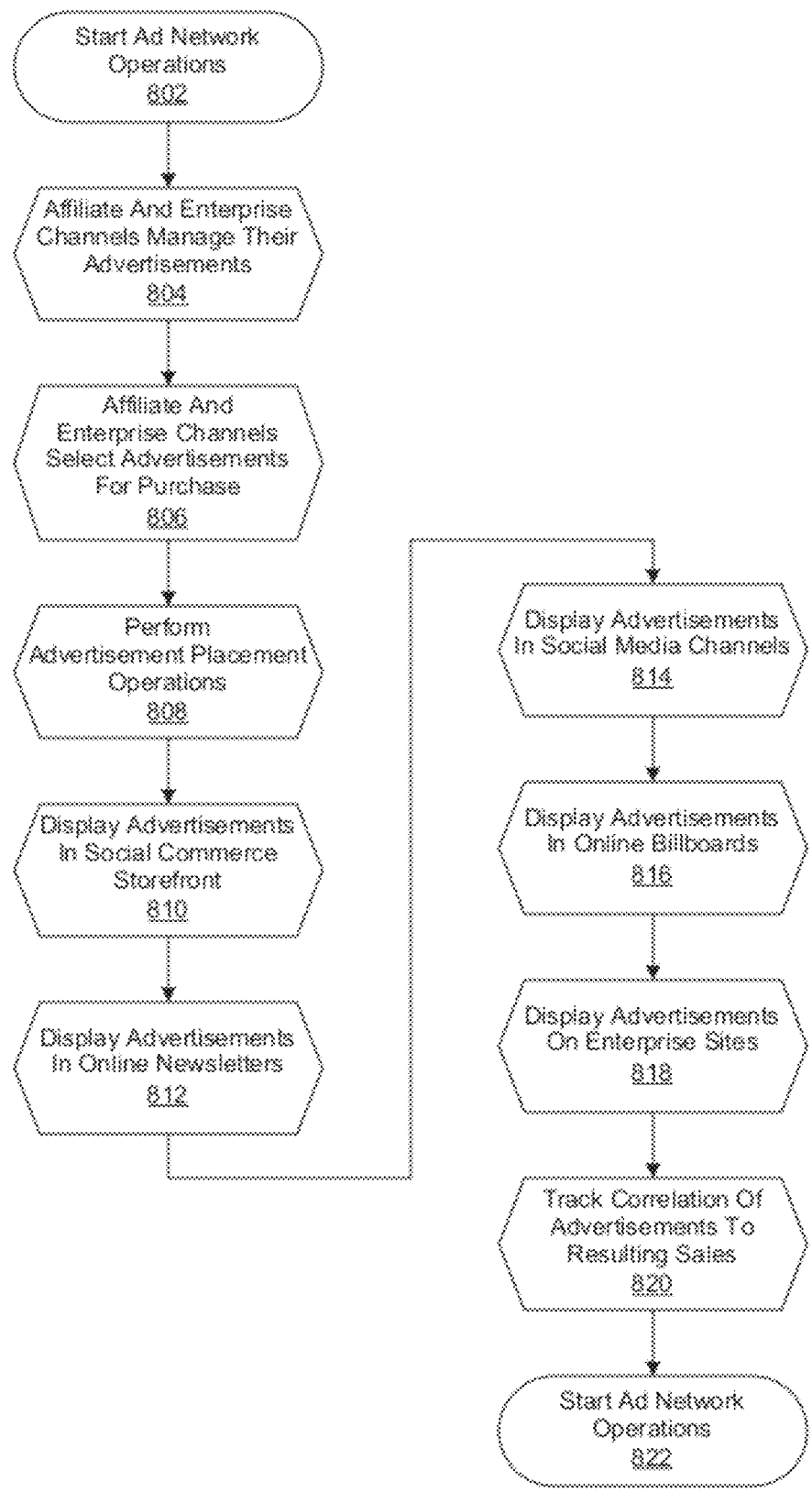
FIG. 8 is a generalized flow chart of the performance of social commerce advertising network management operations.

FIG. 8 is a generalized flow chart of the performance of social commerce advertising network management operations as implemented in accordance with an embodiment of the invention. In this embodiment, advertising network operations are begun in step 802, followed by ongoing operations in step 804 for affiliate and enterprise channels to manage their online advertisements. In step 806 the affiliate and enterprise channels perform ongoing operations to select online advertisements for purchase, followed by corresponding ongoing operations in step 808 to place the purchased online advertisements in predetermined online locations. In steps 810, 812, 814, 816, and 818, the affiliate and enterprise channels perform ongoing operations respectively display the online advertisements in social commerce storefronts, online newsletters, social media channels, online billboards, and enterprise sites. Ongoing operations are then performed in step 820 to correlate sales to the placement of the online advertisements, followed by advertising network operations being ended in step 822.

Figure 9A:
FIGS. 9a-b show the creation of an affiliate offer within a user interface window.
Figure 9B:
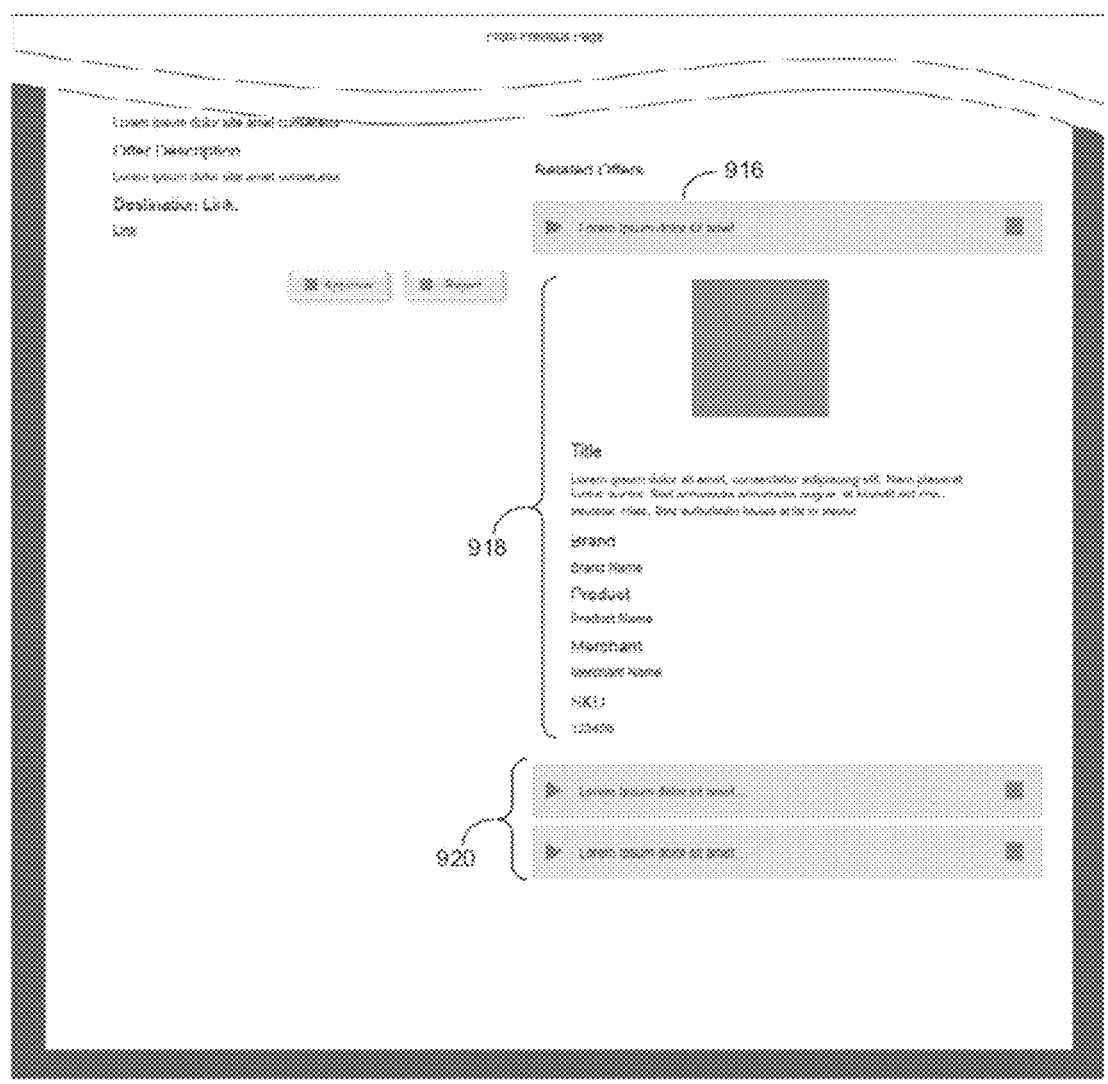

FIGS. 9a-b show the creation of an affiliate offer within a user interface window in accordance with an embodiment of the invention. In this embodiment, a social commerce storefront deals management module, as described in greater detail herein, is implemented within a window 904 of a user interface (UI) 902. As shown in FIG. 9a, the UI window 904 comprises an 'Offers' tab 906, a data entry field 908 for information related to the merchant and the affiliate making the offer, and associated data entry fields 910 corresponding to details of the purchasable product. Likewise, the UI window 904 comprises data entry fields 912 corresponding to details of the offer, as well as an offer display window 914 that provides a preview of the offer as it will appear when presented within a social media environment. As likewise shown in FIG. 9a, data display field 916 displays summary information corresponding to a related offer, and as shown in FIG. 9b, a corresponding offer display window 918 providing a preview of the related offer, as well as data display fields 920 displaying summary information corresponding to other offers.

Figure 10:
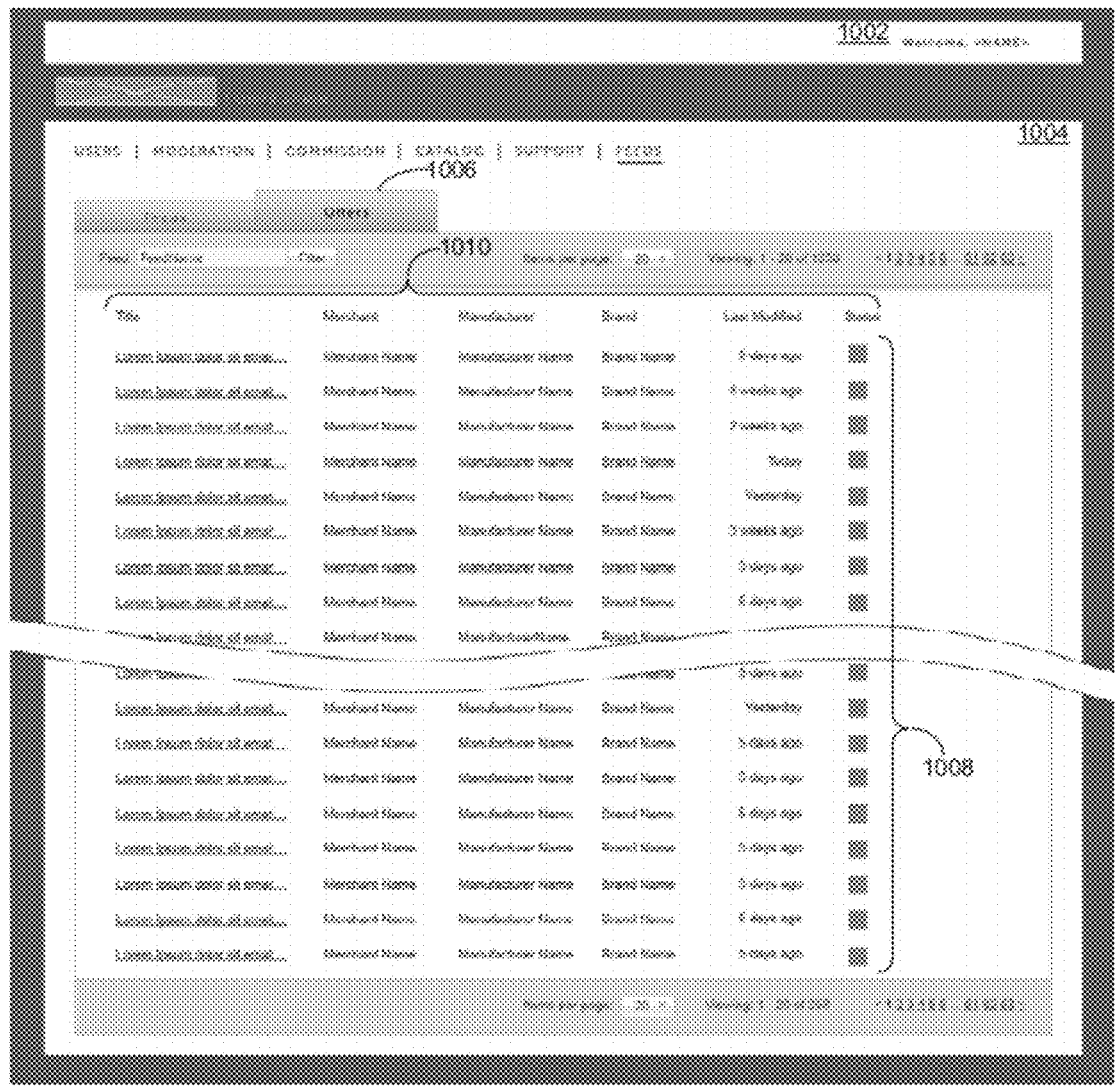
FIG. 10 shows the display of affiliate offers within a user interface window.

FIG. 10 shows the display of affiliate offers within a user interface window implemented in accordance with an embodiment of the invention. In this embodiment, a social commerce storefront deals management module, as described in greater detail herein, is implemented within a window 1004 of a user interface (UI) 1002. As shown in FIG. 10, the UI window 1004 comprises an 'Offers' tab 1006, as well a listing 1008 of a plurality of offers and related information 1010.

Figure 11:
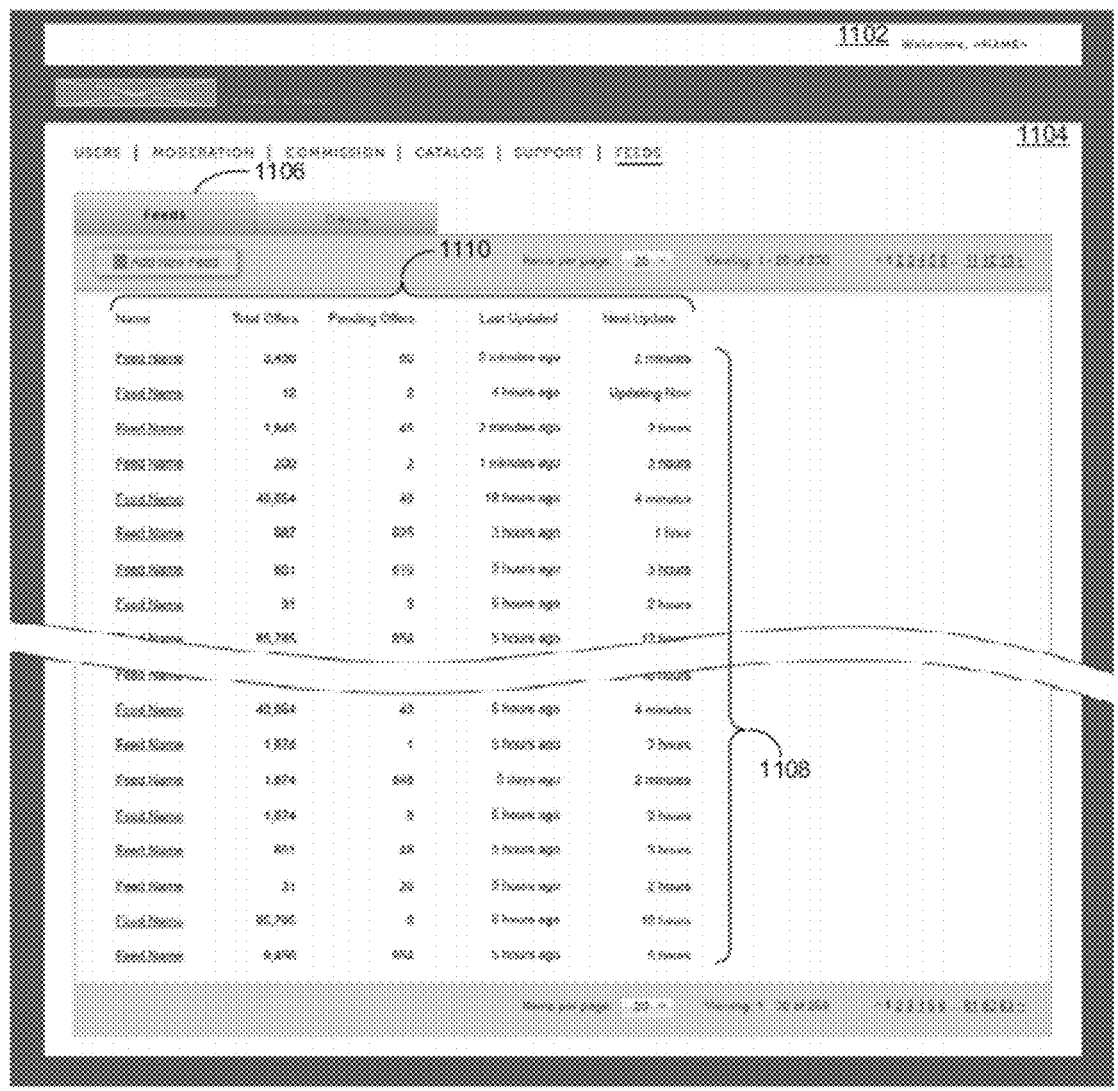
FIG. 11 shows the display of affiliate network feeds and associated offers within a user interface window.

FIG. 11 shows the display of affiliate network feeds and associated offers within a user interface window implemented in accordance with an embodiment of the invention. In this embodiment, a social commerce storefront deals management module, as described in greater detail herein, is implemented within a window 1104 of a user interface (UI) 1102. As shown in FIG. 11, the UI window 1104 comprises an 'Offers' tab 906, as well a listing 1108 of a plurality of advertising network feeds corresponding to referrals resulting from associated offers, and related information 1110.

Figure 12:
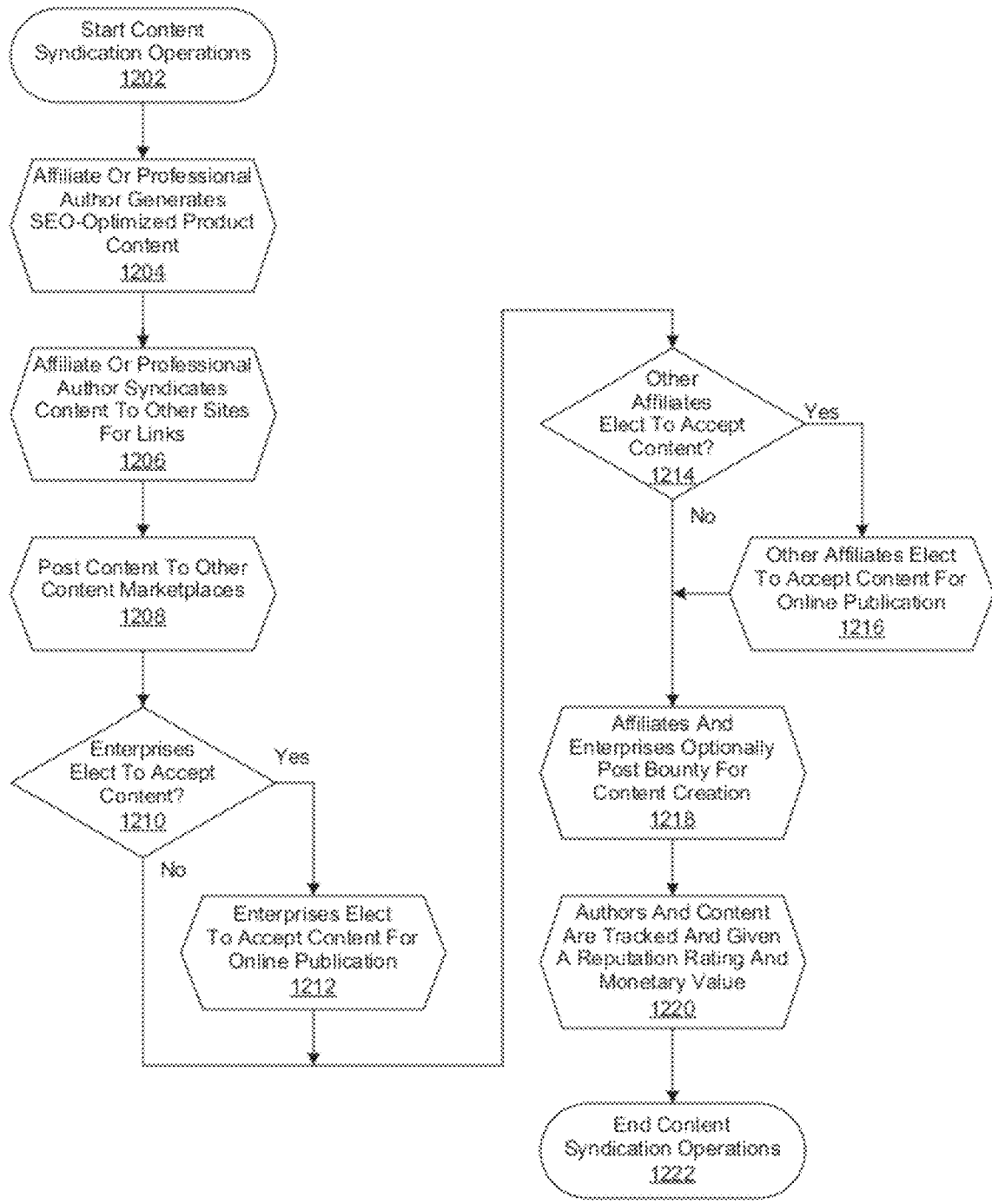
FIG. 12 is a generalized flow chart of the performance of content syndication operations.

FIG. 12 is a generalized flow chart of the performance of content syndication operations as implemented in accordance with an embodiment of the invention. In this embodiment, content syndication operations are begun in step 1202, followed by the ongoing generation of search engine optimization (SEO) content by an affiliate, a professional author, or both, in step 1204. Ongoing syndication operations are then performed in step 1206 to syndicate the SEO content other sites and establish corresponding links. Then, in step 1208, ongoing operations are performed to post the SEO content to other content marketplaces known to skilled practitioners of the art. A determination is then made in step 1210 whether enterprises (e.g., corporations) elect to accept the SEO content. If so, then ongoing operations are performed by the enterprises in step 1212 to accept the SEO content for online publication. As an example, a corporation may elect to post predetermined SEO content on their internal web site for review by employees.

However, if it is determined in step 1210 that enterprises do not elect to accept the SEO content, or if they do so in step 1212, then a determination is made in step 1214 whether other affiliates elect to accept the SEO content for online publication. If so, then ongoing operations are performed by affiliates in step 1216 to accept the SEO content for publication in step 1217. For example, another affiliate may elect to publish SEO content that is complementary to content they generate themselves. However, if it is determined in step 1214 that other affiliates do not elect to accept the SEO content, or if they do so in step 1216, then ongoing operations are performed in step 1218 for enterprises, affiliates, or both, to post a "bounty" (i.e., an offer for compensation) for content creation. Thereafter, ongoing operation are performed in step 1220 to track authors, the content they generate, their corresponding reputation ratings, and the monetary value they receive as compensation for providing the content. Content syndication operations are then ended in step 1222.

Figure 13:
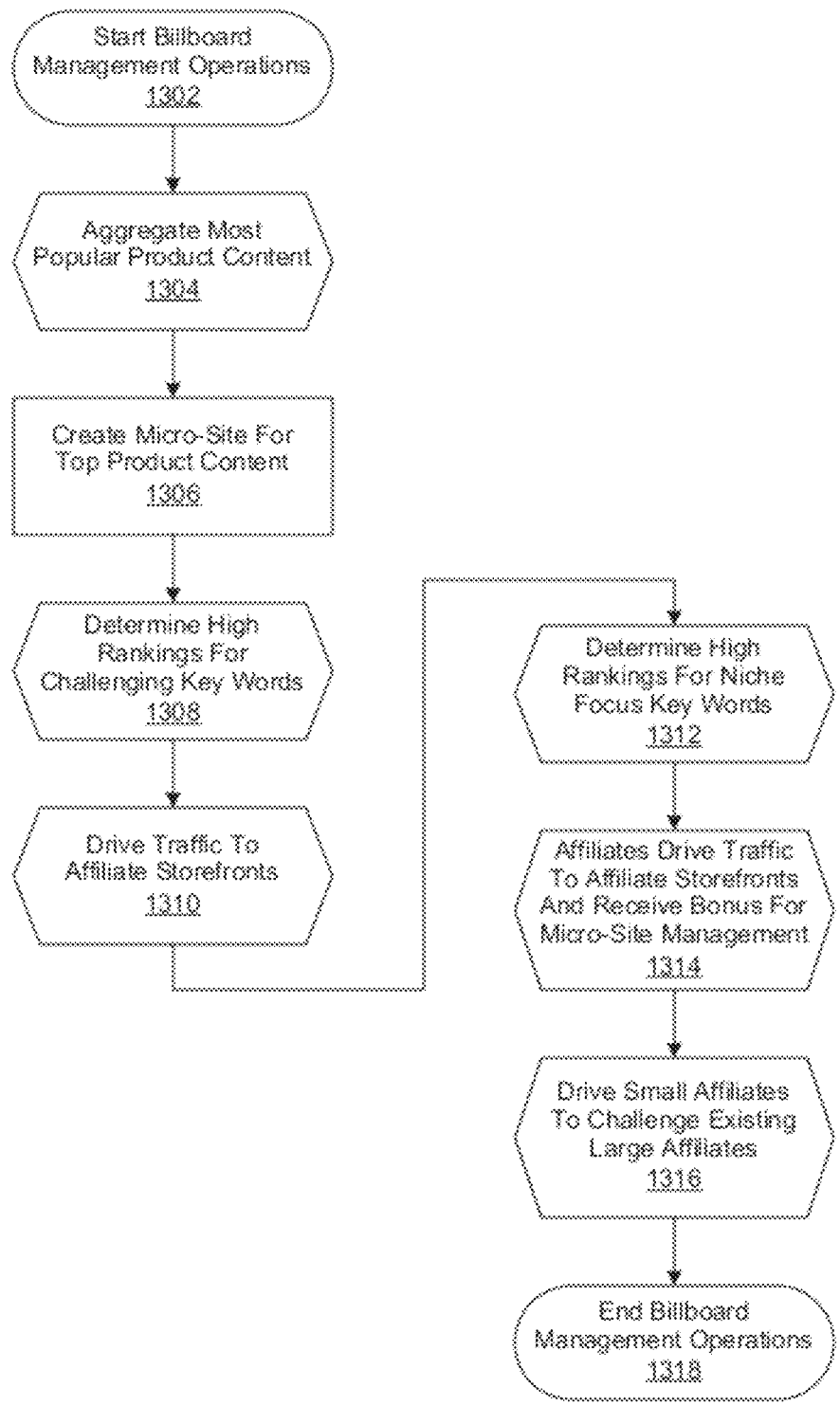
FIG. 13 is a generalized flow chart of the performance of billboard management operations.

FIG. 13 is a generalized flow chart of the performance of billboard management operations as implemented in accordance with an embodiment of the invention. In this embodiment, online billboard management operations familiar to those of skill in the art are begun in step 1320, followed by the ongoing aggregation of the most popular product content in step 1304. A micro site, such as a small, specialized web site, is then created in step 1306, followed by ongoing operations in step 1309 to determine high rankings for challenging key words used in searches for product information. Ongoing operations are then performed in step 1310 to drive traffic to affiliate social commerce storefronts, such as using the high ranking challenging key words in search engine optimization (SEO) operations known to skilled practitioners of the art. Thereafter, ongoing operations are performed in step 1312 to determine high ranking niche focus key words, followed by ongoing operations being performed by affiliates in step 1314 to drive traffic to their storefronts, and accordingly, receive compensation from a merchant for doing so. In step 1316, ongoing operations are performed by the merchant to challenge small affiliates to challenge the sales performance of larger affiliates. Online billboard management operations are then ended in step 1318.

Figure 14A:
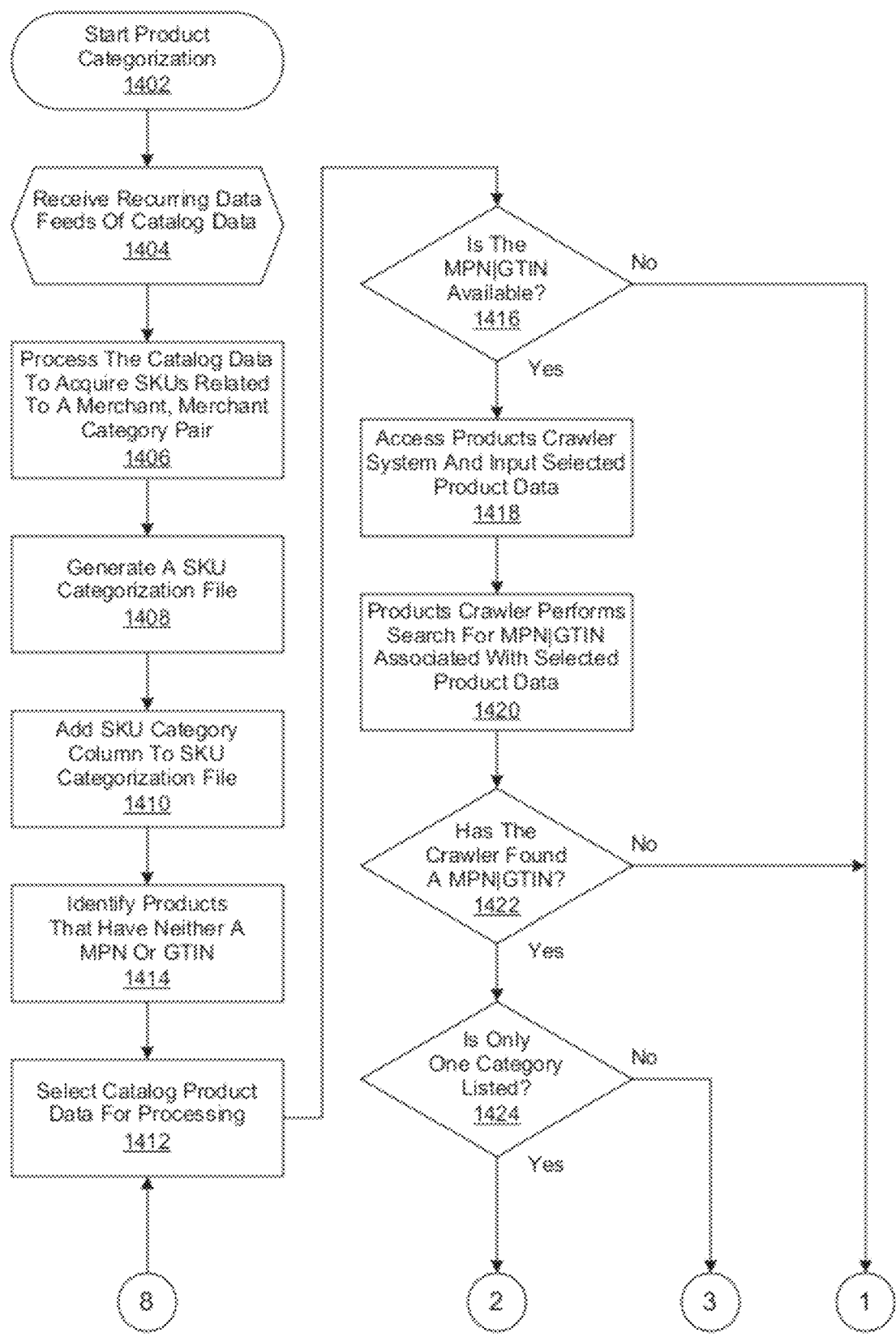
FIG. 14 is a generalized flow chart of the performance of product categorization operations.
Figure 14B:
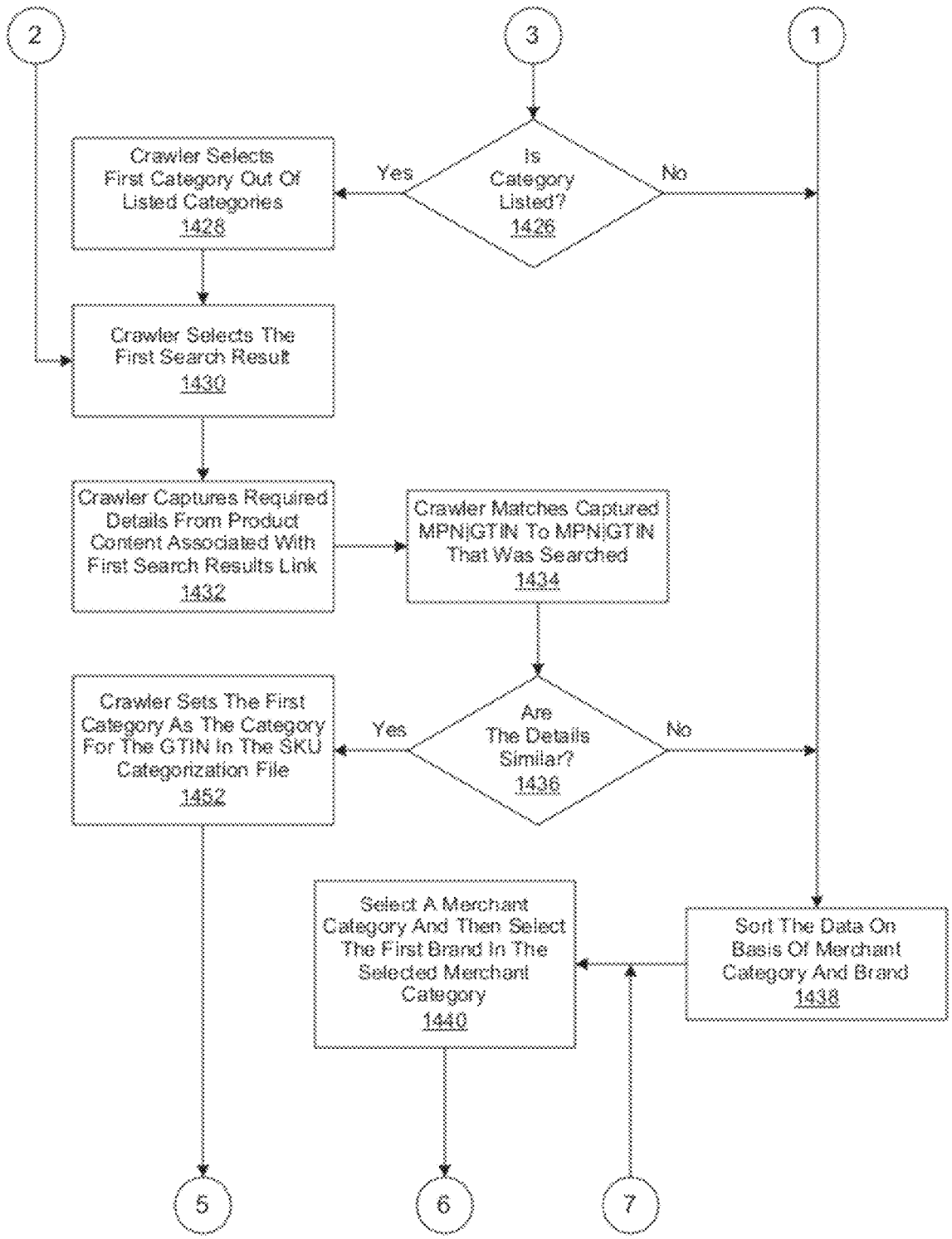
Figure 14C:
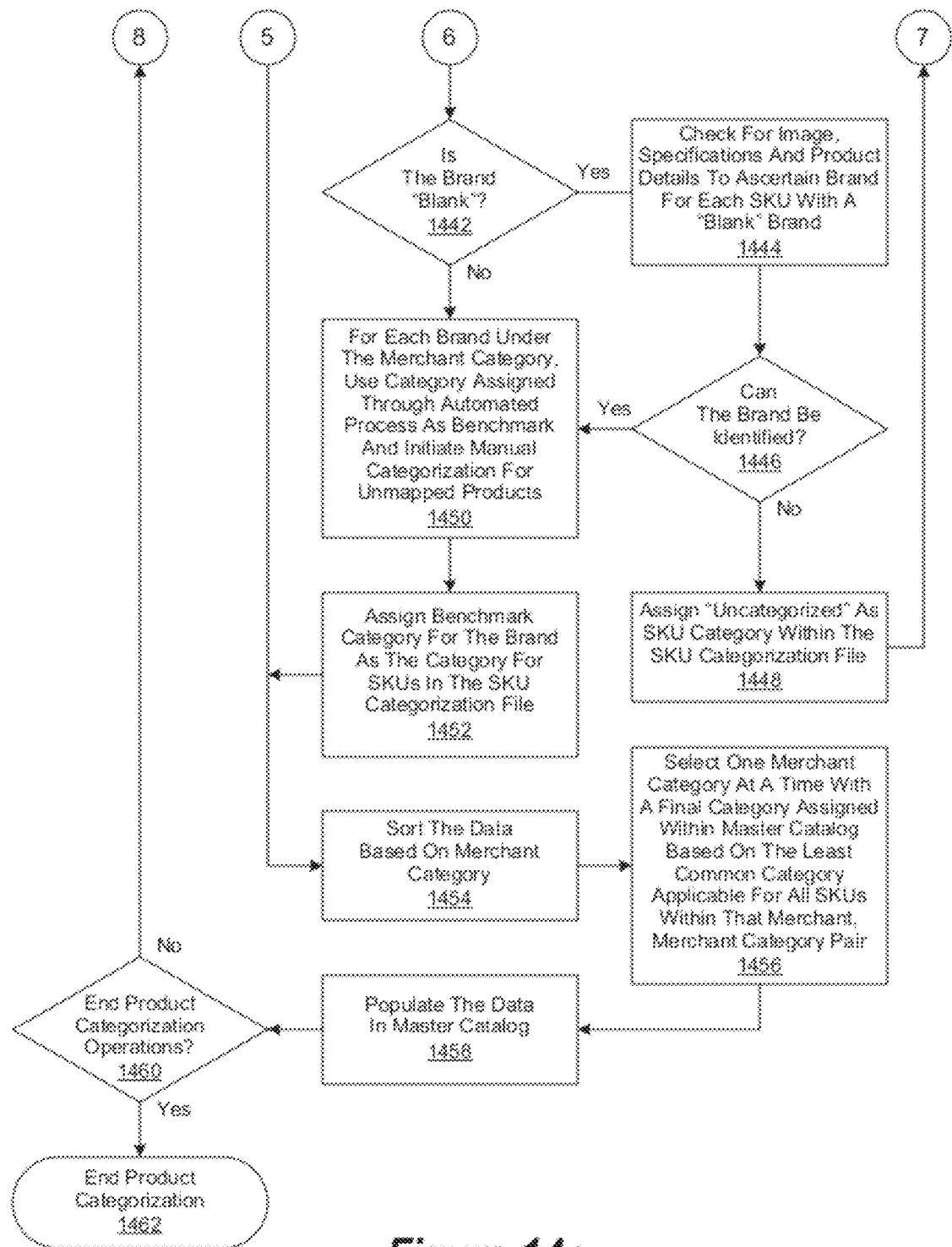
Figure 15A:
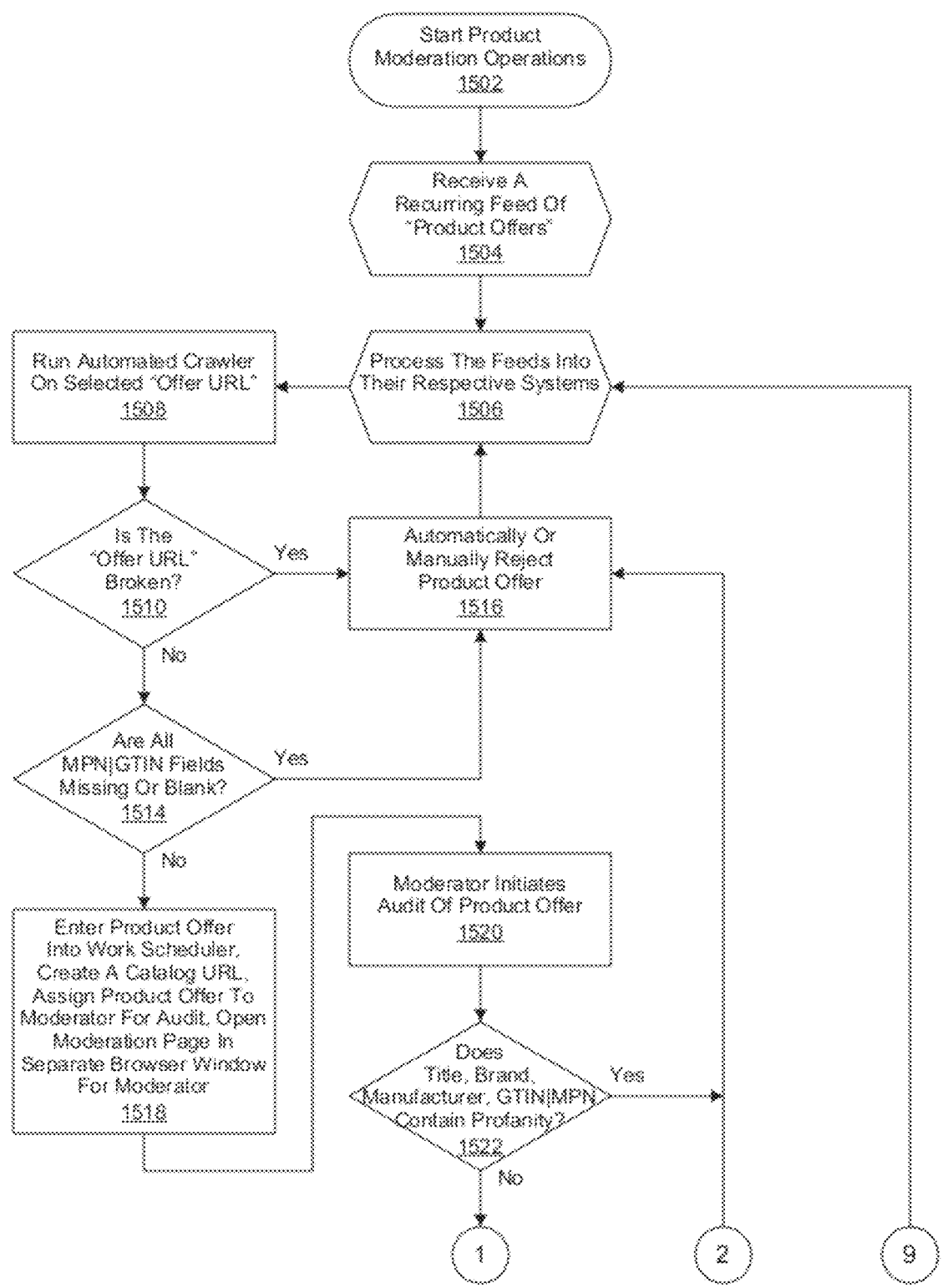
FIG. 15 is a generalized flow chart of the performance of product moderation operations.
Figure 15B:
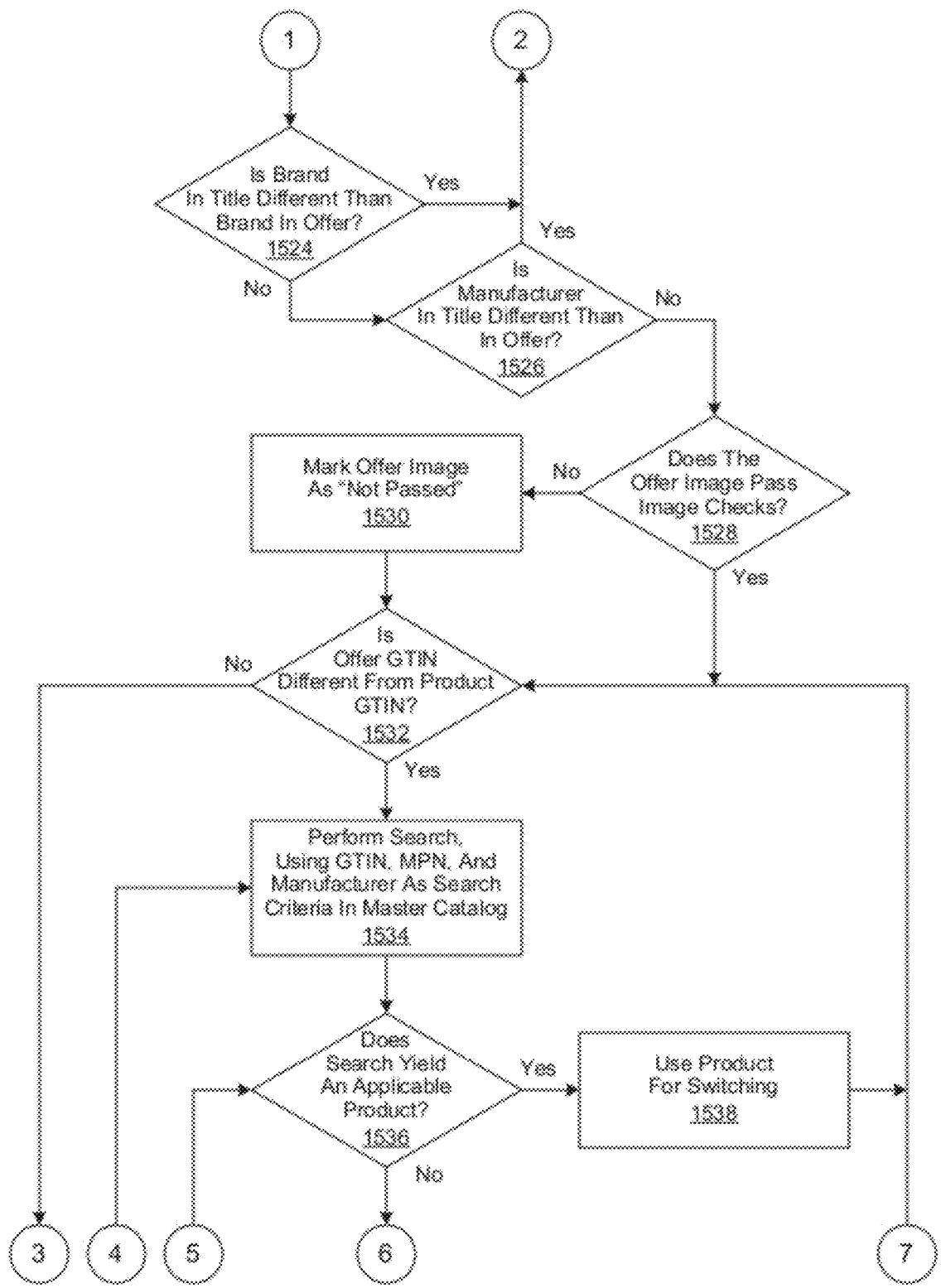
Figure 15C:
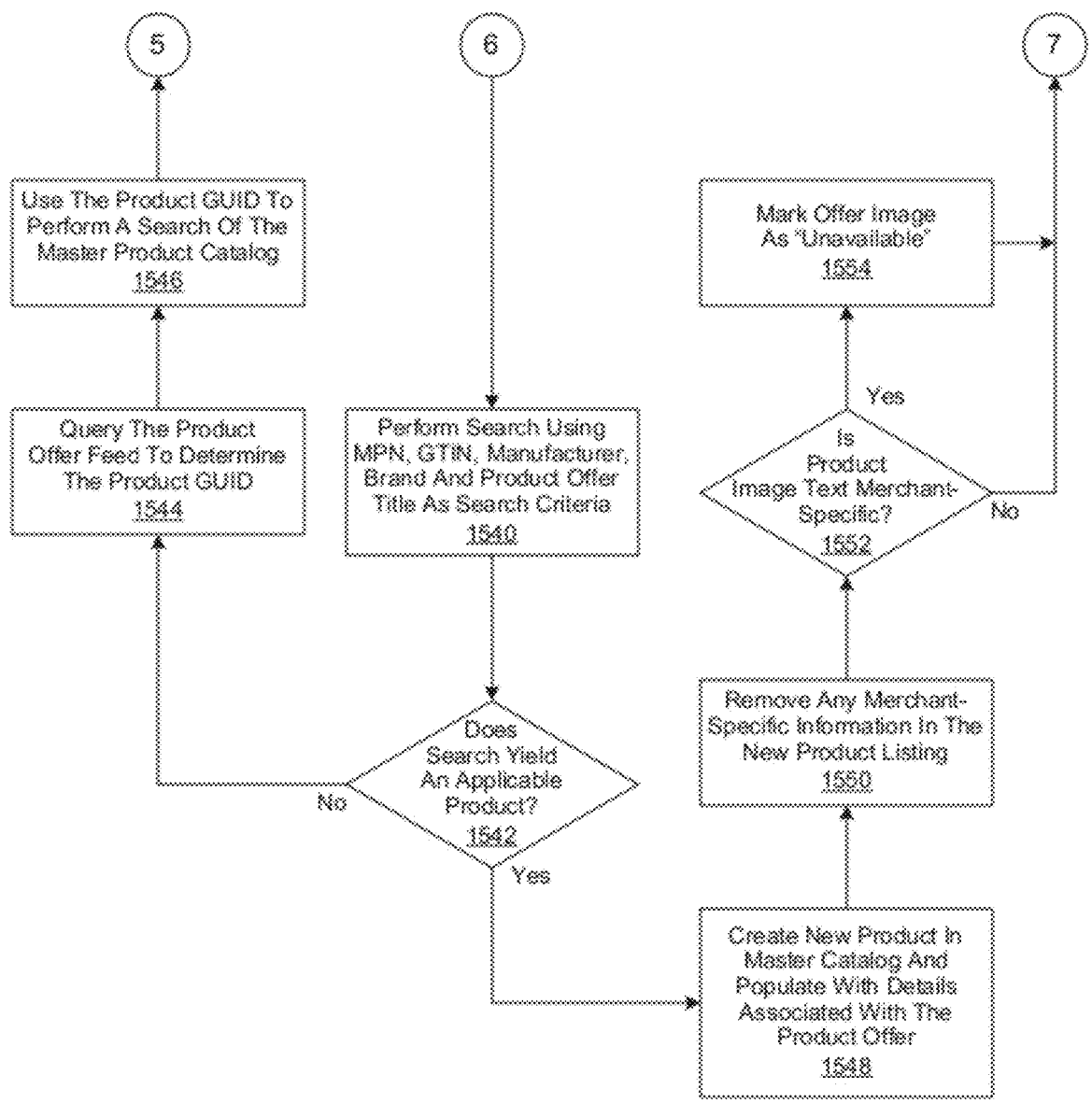
Figure 15D:
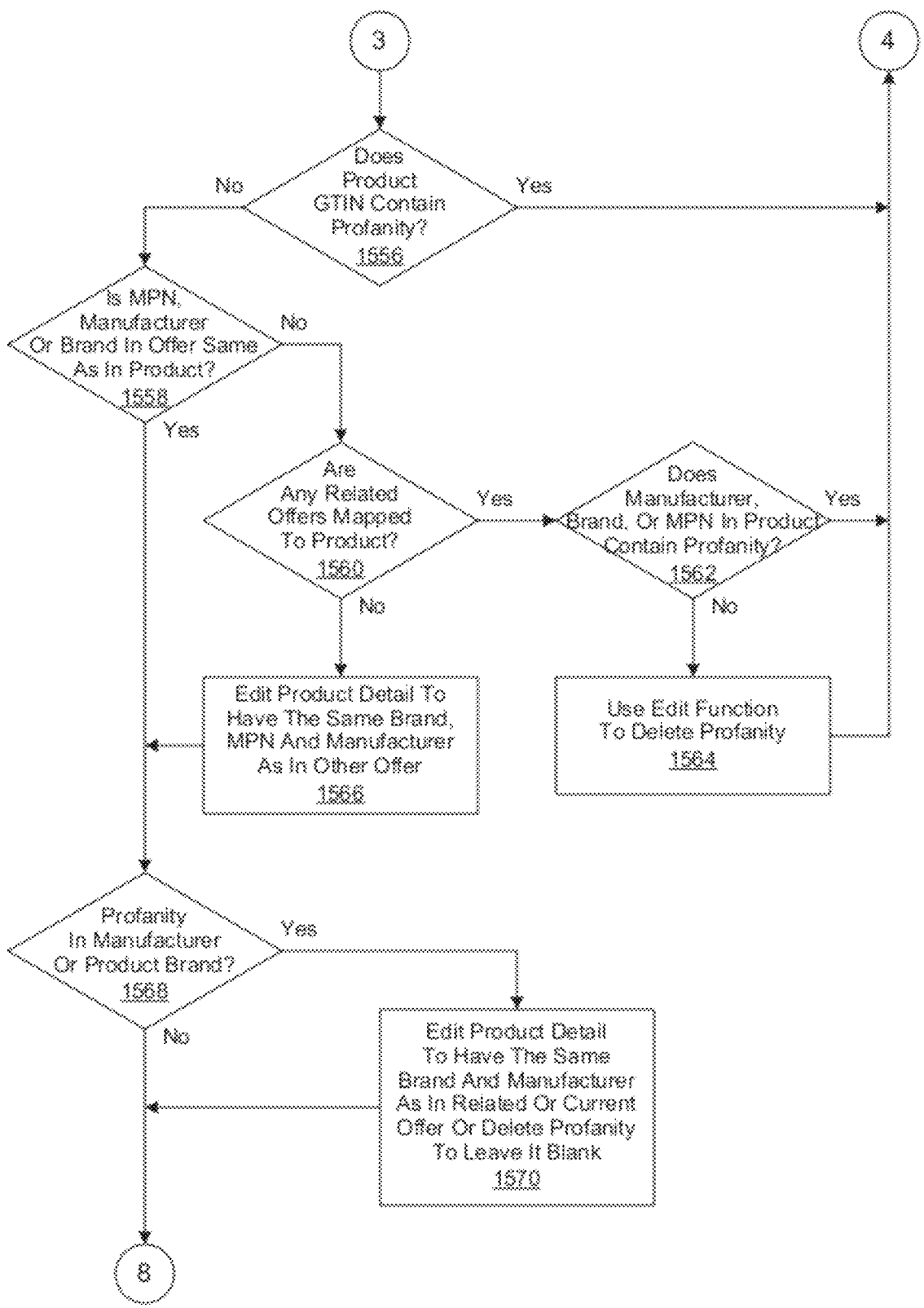
Figure 15E:
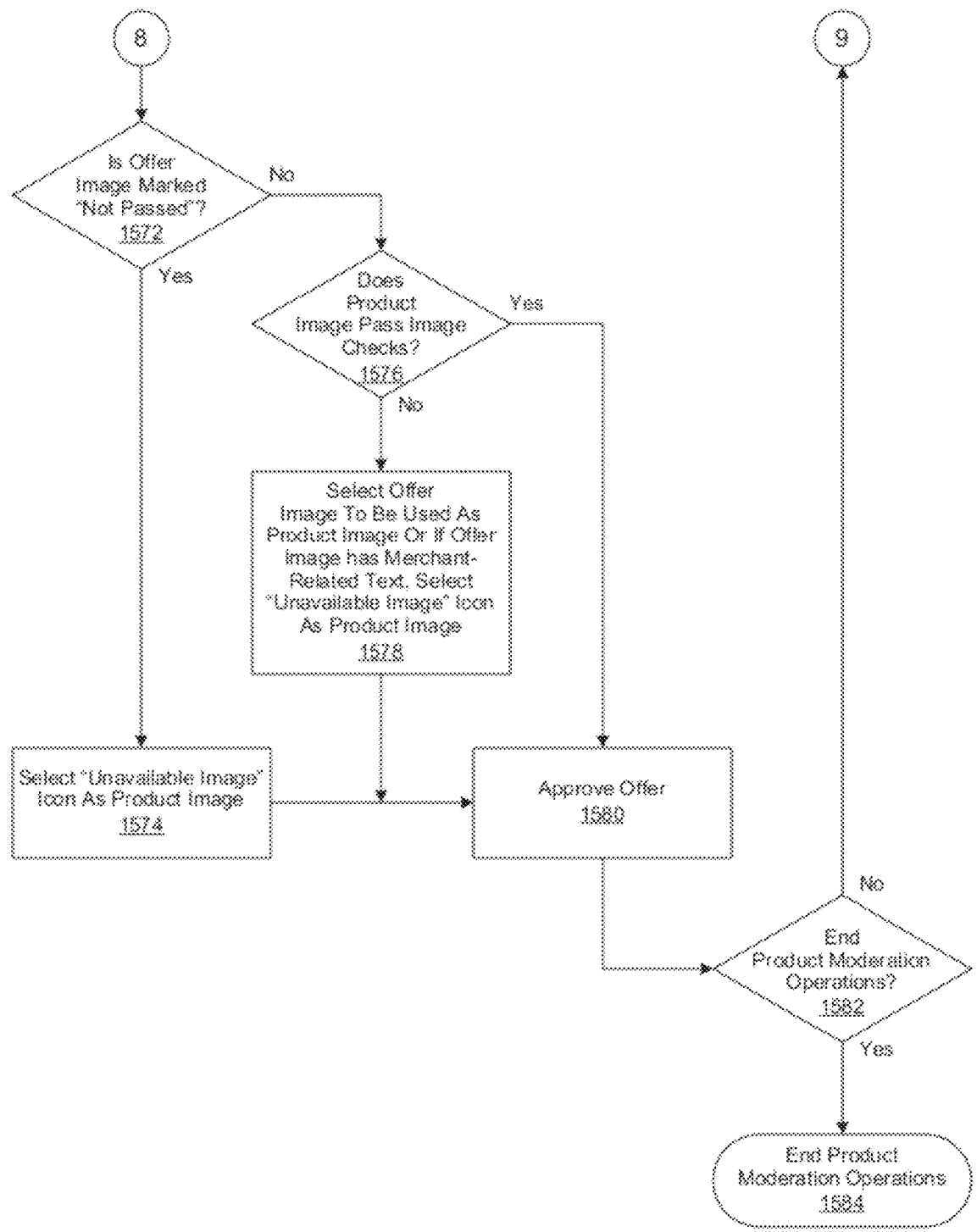

FIG. 14 is a generalized flow chart of the performance of product categorization operations as implemented in accordance with an embodiment of the invention. In this embodiment, product categorization operations are begun in step 1402, followed by the receipt of recurring data feeds of catalog data from a vendor, merchant or other product source in step 1404. The catalog data is then processed in step 1406 to acquire stock keeping units (SKUs) related to an individual vendor, merchant or other product source, their corresponding merchant category pairs, Global Trade Item Numbers (GTINs), and manufacturer part numbers (MPNs). As used herein, a merchant category pair refers to a pairing of an individual vendor, merchant or other product source and a predetermined product category.

A SKU categorization file is then generated in step 1408, followed by the addition of a SKU category column to the SKU categorization file in step 1410. Then, in step 1412, target product catalog data feeds are consolidated into batches for processing. The consolidated product catalog data is processed to identify products that have neither a MTN nor a GTIN (MPN|GTIN). Catalog product data is then selected for processing in step 1412, followed by a determination being made in step 1414 whether the selected catalog product data comprises MPN|GTIN data. If so, then a products crawler system, such as a web crawler system familiar to those of skill in the art, is accessed and the selected catalog product data is inputted in step 1418. The products crawler then performs a search in step 1420 for the MPN|GTIN associated with the selected product data. It will be appreciated by those of skill in the art that in various embodiments the product crawler may be implemented to crawl web pages, sites, and other data repositories residing on the Internet at-large, private and proprietary data repositories, or both.

A determination is then made in step 1422 whether the product crawler has identified additional product data corresponding to the MPN|GTIN associated with the selected product data. If so, then a determination is made in step 1424 whether only one product category is listed for the MPN|GTIN. If not, then a determination is made in step 1426 whether the product category is listed within the master product catalog. If so, then the product crawler selects the first product category out of a set of listed categories in step 1428. Thereafter, or if it was determined in step 1424 that only one product category was listed, the product crawler selects the first search result. Then, in step 1432, the product crawler captures all required details from product content associated with the link to the first search result. The product crawler then matches the captured MPN|GTIN to the MPN|GTIN returned in the product crawler search in step 1434, followed by making a determination in step 1436 whether the product details between the two MPN|GTIN are similar. If not, or if it was determined in step 1416 that the MPN|GTIN was not available, or in step 1422 that the product crawler did not find a MPN|GTIN, or in step 1426 that a product category was not listed, then the product data is sorted on the basis of merchant category and product brand. Then, in step 1440, a merchant category is selected, followed by selecting the first product brand in the selected merchant category.

A determination is then made in step 1442 whether the product brand in the selected merchant category is "blank," (e.g., "generic," not specified, etc.). If so, then a check is performed in step 1444 with the associated product image specifications and product details to ascertain a product brand for each SKU with a "blank" product brand. A determination is then made in step 1446 whether the product brand can be verified. If not, then the SKU category within the SKU categorization file is assigned a value of "uncategorized" and the process is continued, proceeding with step 1440. Otherwise, or if it was determined in step 1442 that the product brand was not "blank," then for each product brand under the merchant category, a category assigned by an automated process is used as a benchmark and to initialize manual categorization for unmapped products in step 1450. The benchmark category for the product brand is then assigned in step 1452 as the category for SKUs in the SKU categorization file.

However, if it was determined in step 1436 that the product details between the two MPN|GTIN are not similar, then the product crawler sets the first category as the category for the GTIN in the SKU categorization file. Thereafter, or after the benchmark category for the product brand has been assigned in step 1452, then the product data is sorted, based on merchant category, in step 1454. Then, in step 1456, one merchant category at a time is selected, with a final merchant category being assigned within the master catalog, based on the least common category applicable for all SKUs within that merchant and merchant category pair. The product data is then populated in the master catalog, followed by a determination in step 1460 whether to end product categorization operations. If not, then the process is continued, proceeding with step 1412. Otherwise, product categorization operations are ended in step 1462.

FIG. 15 is a generalized flow chart of the performance of product moderation operations in accordance with an embodiment of the invention. In this embodiment, product moderation operations are begun in step 1502, followed by the receipt of a recurring data feed of "product offers" in step 1404. As used herein, "product offers" refer to product data associated with a product being offered for sale, or resale, by a merchant, vendor, manufacturer or other product source. The product offer data feeds are then processed by various systems associated with the product moderation process in step 1506 and an automated product crawler system, such as a web crawler system familiar to those of skill in the art, is run on the URL of a selected product offer in step 1508.

A determination is then made in step 1510 whether the URL associated with the selected product offer is broken. If so, then the product offer is automatically or manually rejected in step 1516 and the process is continued, proceeding with step 1506. Otherwise, a determination is made in step 1514 whether all MPN|GTIN fields in the product offer are blank. If so, then the product offer is automatically or manually rejected in step 1516 and the process is continued, proceeding with step 1506. Otherwise, in step 1518, the product offer is entered into a work scheduler, a master catalog URL is created, the product offer is assigned to a moderator for auditing, and a moderation page is opened in a separate browser window for the assigned moderator.

The assigned moderator then initiates the audit of an assigned product offer in step 1520, followed by a determination being made in step 1522 whether the title, brand, manufacturer, or MPN|GTIN fields contain profanity. If so, then the product offer is automatically or manually rejected in step 1516 and the process is continued, proceeding with step 1506. Otherwise, a determination is made in step 1524 whether the brand in the product offer title is different than the brand referenced within the product offer itself. If so, then the product offer is automatically or manually rejected in step 1516 and the process is continued, proceeding with step 1506. Otherwise, a determination is made in step 1526 whether the manufacturer in the product offer title is different than the brand referenced within the product offer itself. If so, then the product offer is automatically or manually rejected in step 1516 and the process is continued, proceeding with step 1506.

Otherwise, a determination is made in step 1528 whether the product image associated with the product offer passes image checks. As an example, the product image may not pass the image check if it contains pornography, nudity or profanity. As another example, the product image may not pass the image check if shows a product that is different than a product described within the title of the product offer or within the product offer itself. If it is determined in step 1528 that the product offer image does not pass the image checks, then the product offer image is marked as "not passed" in step 1530. Thereafter, or if it was determined in step 1528 that the product offer image passed the image checks, then a determination is made in step 1532 whether the GTIN of the product offer is different than the GTIN of the product itself. If so, then a search is performed in step 1534, using GTIN, MPN, and manufacturer name as search criteria to perform the search in the master catalog.

A determination is then made in step 1536 whether the search yielded an applicable product. If so, then the product data associated with the applicable product is used in step 1538 to replace (i.e., "switch") the product data associated with the product offer. The process is then continued, proceeding with step 1532. However, if it was determined in step 1538 that the search did not yield an applicable product, then a search is performed in step 1540 using the MPN, GTIN, manufacturer name, and the title of the product offer as search criteria. A determination is then made in step 1542 whether the search yielded an applicable product. If not, the product offer data feed is queried in step 1544 to determine the Global Unique Identifier (GUID) associated with the product offer. The GUID is then used to perform a search of the master product catalog and the process is then continued, proceeding with step 1536.

However, if it is determined in step 1542 that the search yields an applicable product, then a new product is created in the master catalog in step 1548 and populated with the details associated with the product offer. Any information specific to the merchant, vendor or other source of the product offer is then removed from the new product listing in step 1550. A determination is then made in step 152 whether the product image associated with the new product listing is specific to the merchant, vendor or other source of the product offer. If so, then the product image associated with the product offer is marked as "unavailable" in step 1554. Thereafter, or if the product image associated with the new product listing is not specific to the merchant, vendor or other source of the product offer, the process is continued, proceeding with step 1532.

However, if it is determined in step 1532 that the GTIN of the product offer is not different from the GTIN of the product itself, then a determination is made in step 1556 whether the product GTIN contains profanity. If so, then the process is continued, proceeding with step 1534. Otherwise, a determination is made in step 1558 whether the MPN, manufacturer name, or product brand in the product offer is the same as the product itself. If not, then a determination is made in step 1560 whether any related product offers are mapped to the product itself. If so, then a determination is made in step 1562 whether the MPN, manufacturer name, or product brand in the product offer contains profanity. If so, then the process is continued, proceeding with step 1534. Otherwise, an edit function is implemented in step 1564 to manually or automatically delete the profanity from MPN, manufacturer name, or product brand in the product offer and the process is continued, proceeding with step 1534. However, if it is determined in step 1560 that no other product offers are mapped to the product itself, then the product detail is manually or automatically edited in step 1566 to have the same MPN, manufacturer name, or product brand as the other product offer.

Thereafter, or if it is determined in step 1558 that the MPN, manufacturer name, or product brand in the product offer is the same as the product itself, a determination is made in step 1568 whether the manufacturer name or product brand contains profanity. If so, then the product offer is either manually or automatically edited in step 1570 to have the same product brand and manufacturer name as in the related product offer or any identified profanity is deleted. Thereafter, or if is determined in step 1568 that there is no profanity in the manufacturer name or product brand, then a determination is made in step 1572 whether the product image associated with the product offer is marked "not passed." If so, then an "unavailable image" is selected in step 1574 as the product image. Otherwise, a determination is made in step 1576 whether the product image passes image checks. If not, then a product offer image is selected in step 1578 as the product image in the master catalog, or alternatively, an "unavailable image" is selected if the product offer image has merchant-related text. Otherwise, or once the product offer images have respectively selected in steps 1574 or 1578, the product offer is approved in step 1580. A determination is then made in step 1582 whether to end product moderation operations. If not, then the process is continued, proceeding with step 1506. Otherwise, product moderation operations are ended in step 1584.

Figure 16A:
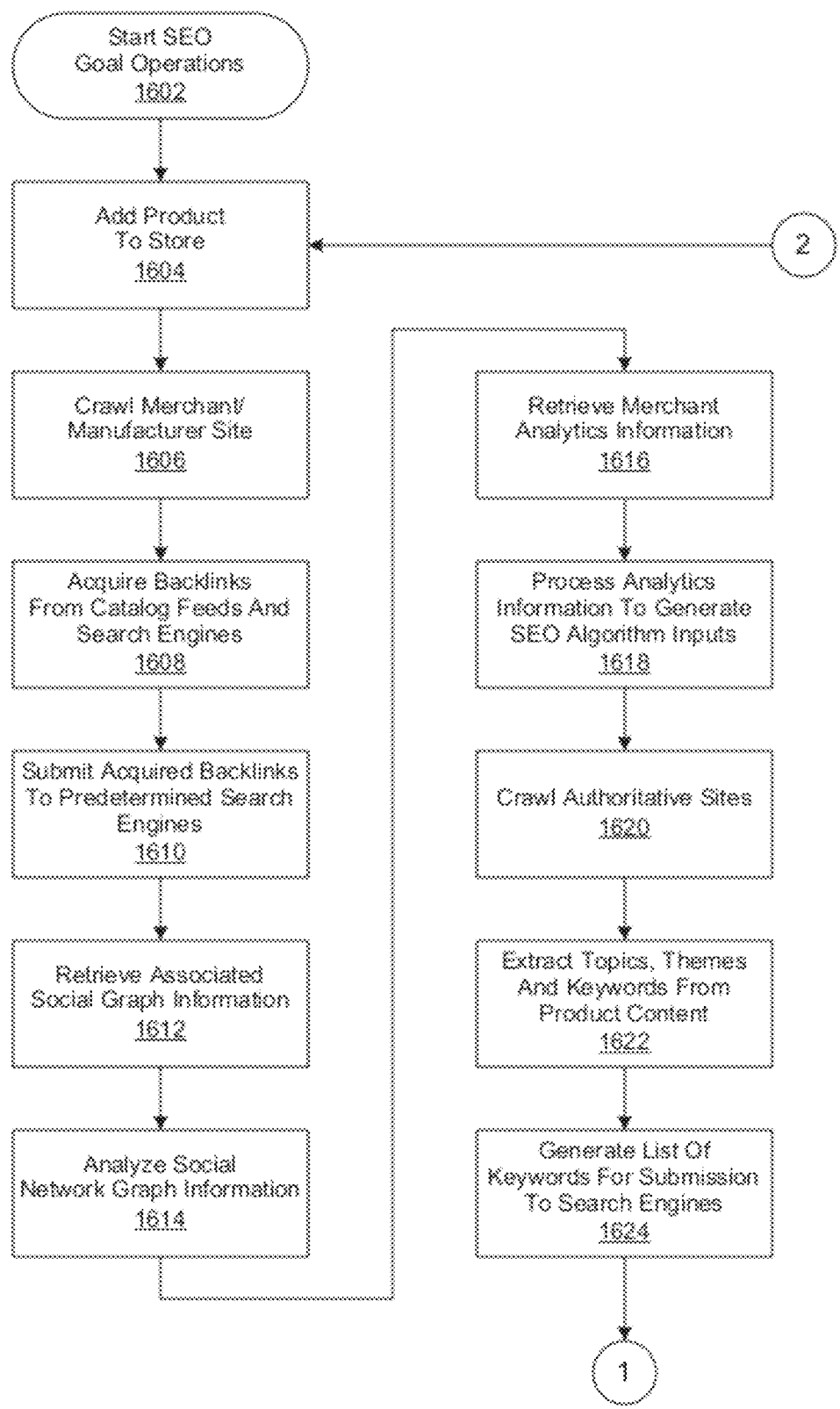
FIGS. 16a-b are a generalized flow chart of the performance of search engine optimization (SEO) goal attainment operations.
Figure 16B:
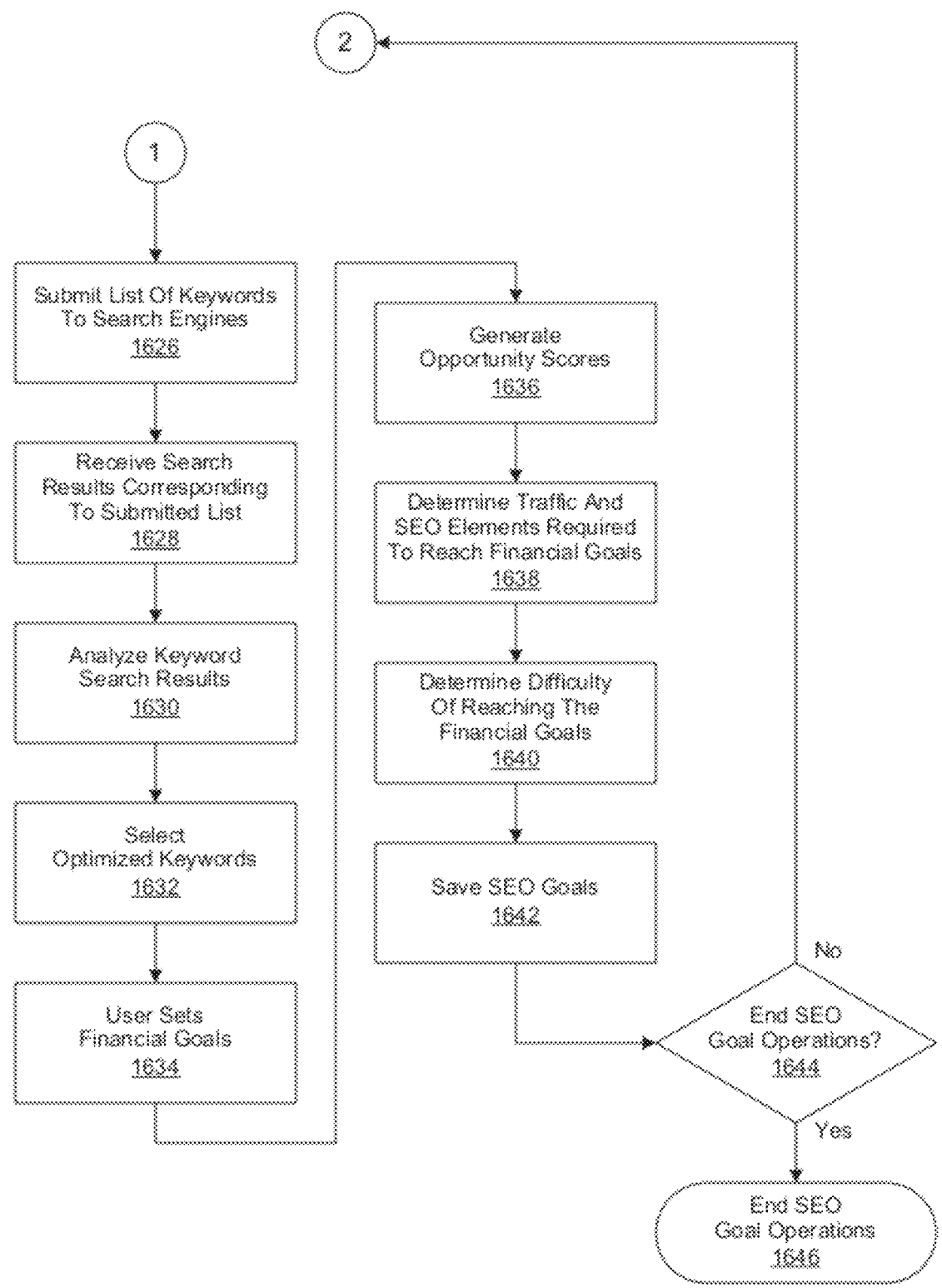

Referring now to FIG. 16, SEO goal operations are begun in step 1602 to predict the estimated revenue of a predetermined product, followed by addition of the predetermined product from a store's catalog to a social commerce storefront in step 1604. In various embodiments, the social commerce marketplace system automatically creates an associated product details page within the store when the product is added. In these and other embodiments, the product details page comprises merchant, manufacturer, or store owner-defined content such as a product title and descriptions. In various embodiments, the store owner can optionally create additional product content and metadata, such as:

Title
Short Description
Long Description
Friendly (vanity) URLs
Keywords
Specifications
Ratings
Reviews
Product Blog
Posts to third party social sites about the product Then, in step 1606, manufacturer links, such as Uniform Resource Locators (URLs), provided in the catalog feeds described in greater detail herein are used by the social commerce marketplace system as primary sources to crawl for product content. In one embodiment, the social commerce marketplace system submits a search request to a search engine to obtain links to crawl if the manufacturer links are not included in the feed. In various embodiments, the crawled content is indexed and used by other process steps described in greater detail herein to identify keywords and high value content.

The social commerce marketplace system then acquires the domains included in the merchant's catalog feed(s) as well as the highest ranked pages within predetermined search engines in step 1608. Then, in step 1610, the acquired domains and website URLs (i.e., backlinks) are submitted to predetermined search engines, as well as other data service providers, to retrieve the number, quality, trust, and other information about the inbound links to each domain. In various embodiments, this information is stored within the social commerce marketplace system and is subsequently used to determine the relative competitiveness of other vendors in the market as well as sources to crawl for recommended content and keywords for use in various SEO operations.

Then, in step 1612, social graph information and social site history from predetermined social network sites for the store's social accounts (e.g., store entity, store owner users, etc.) is retrieved. The retrieved information is then analyzed by the SEO algorithm in step 1614 to identify high-value keywords, content, backlinks and influencers for the product within the social graph(s). In various embodiments, the retrieved product information may be contained in social objects such as "wall posts," comments, "tweets," profiles, stores, events, etc. In various embodiments, the retrieved content is semantically analyzed to determine the sentiment (i.e., the "tone" of the content) for each extracted element. In certain of these various embodiments, the social commerce marketplace system scores the retrieved keywords and content according to the source's authoritative value and the content creator's social influence (e.g., their digital worth score).

As used herein, authoritative value broadly refers to the contextual relationship of a keyword to the overall theme of its associated content source. As an example, the search term "Lincoln automobile" may return the phrase "the Lincoln automobile is named after President Abraham Lincoln," where the content source is a first web page primarily oriented to the history of President Lincoln. In this example, authoritative value is low. As another example, the same search term may return the same phrase, but from a second web page primarily oriented to the history of the Lincoln automobile. In this example, the authoritative value is high.

As likewise used herein, social influence broadly refers to the level of influence a user of a social networking environment is capable of exerting upon a predetermined market segment. In various embodiments, a digital worth score is derived from a user's social influence. As used herein, a digital worth score refers to a numeric value, or set of values, associated with a predetermined user's social influence. As an example, a user may write a blog extolling the virtues of a product, with the result that a high percentage of the readers of the blog purchase the product. In this example, the writer of the blog would have a high digital worth score. In these and other embodiments, the financial value of the associated purchase(s) of the referenced product is used to determine the digital worth score.

In various embodiments, the SEO algorithm uses additional information associated with the content authors and influencers that is stored within the social commerce marketplace system, including their:
- name
- email addresses
- IP Address
- geographic location
- preferences The social commerce marketplace system then retrieves available historical clickstream web analytics information in step 1616. In various embodiments, the analytics information is retrieved from corporate web sites associated with the store owner that contain product or product related information. The analytics information is then processed to generate inputs for the SEO algorithm in step 1618. In various embodiments, the retrieved analytics information includes:
- Web Analytics Data
    - Visitor personal information (e.g., name, demographics, prior purchase history, etc.)
    - Referring keywords (e.g., associated with source, visitor, geo-location, temporal information, etc.)
    - Conversion Data
- Listing Platform Data
    - Content
    - Source (e.g., person or entity)
    - Sentiment
    - Media (e.g., web, television, radio, etc.)
    - Location One or more authoritative sites are then crawled in step 1620 to determine keywords and content related to the product, which may include:
- titles
- product name
- descriptions
- ratings
- reviews
- pricing
- discounts
- offers
- location(s)

As used herein, an authoritative site broadly refers to the contextual relationship of individual content elements within a content source.

To extend the previously-used example, the phrase "the Lincoln automobile is named after President Abraham Lincoln," in a first web page primarily oriented to the history of President Lincoln may not be considered to be an authoritative site on the Lincoln automobile. Conversely, the same phrase in a second web page primarily oriented to the history of the Lincoln automobile may be considered to be an authoritative site on the Lincoln automobile.

Once the product has been added to the on-line store, the social commerce marketplace system semantically extracts topics, themes and keywords from the product's content and associated metadata in step 1622. In various embodiments, such content and associated metadata comprises:
- merchant or manufacturer-defined content (e.g., titles, descriptions, promotion, pricing, etc.)
- store owner-defined content
- content defined by other store owners
- visitor-generated content
- third party content and data sources (e.g., backlinks)

In various embodiments, additional third party data related to the product is extracted and stored within the social commerce marketplace system, including:
- sales information, such as:
    - number of units manufactured and sold
    - average sales price
    - sales location
    - ratings and reviews
    - demographics related to owners of the product A list of keywords, themes and topics from the previous process steps, along with any additional keywords that were extracted for the same catalog product when it was last added or analyzed for other stores is then generated in step 1624. The resulting list is then submitted to various search engines as well as other data service providers to retrieve additional information in step 1626. Search results corresponding to each element of the submitted list is then received in step 1628. In various embodiments, the search results include:
- keyword ideas, referring to additional sets of keywords that are related to the submitted keyword
- local search traffic, referring to the number of searches submitted to the search engine for a predetermined geographic region
- global search traffic, referring to the number of searches submitted to the search engine by all Internet users
- mobile search traffic, referring to the number of searches submitted to the search engine via mobile devices
- frequency, referring to the frequency that the keyword is searched
- competition, referring to the relative frequency of bids combined with the value and associated ad price of each keyword within various advertising networks
- traffic estimation, referring to the estimated traffic, the estimated number of paid visits, the estimated paid search rank, and the estimated paid search cost per day
- category, referring to various businesses, industries, genera's, etc. that the search engine has determined that the keyword is most closely associated with
- domains and websites, referring to a list of the highest-ranked domain or website for a predetermined keyword
- demographics, referring to the demographics corresponding to a set of users that used the keyword
- purchase|conversion information, referring to a list of products and prices that a user purchased after searching with a keyword combined with the corresponding site where the purchase was made
- ad competition, referring to the relative market competitiveness of the keyword for a paid search within a commercial search engine service or within an advertising network
- vendors|competitive pricing information, referring to a list of top-performing vendors selling a product associated with a predetermined product, combined with its current price The keyword search results received in step 1628 are then analyzed by the SEO algorithm in step 1630 to generate a keyword score corresponding to each keyword's estimated effect on inbound traffic, conversion rate, competiveness, competitive pricing, and other factors. Then, in step 1632, the SEO algorithm uses a variety of SEO formulas and optimization best practices to process the keyword scores generated in step 1630 to generate a ranked list of keywords predicted to result in the highest amount of traffic and conversion rates.

In step 1634, the user (e.g., an online store owner) uses various financial goal information to set financial goals for the product before it is published to the online store. In various embodiments, the financial goal information may include:

commissions, referring to the amount of monthly commission revenue the store owner would like to generate for the product ad revenue, referring to the amount of monthly ad revenue the store owner would like to generate for the product's associated product detail page quantity, referring to the number of product units the store owner would like to sell on a monthly basis A series of market opportunity (i.e., market penetration) scores are then generated in step 1636 from the data collected and analyzed in the previous process steps to identify areas that the product may perform well in (e.g., low competition, high demand, etc.). In various opportunities, these areas may include local market, referring to one or more local geographic areas social network, referring to one or more social networks or populations (i.e., segments) of users geo-location/region, referring to a state, country, or other geographic region search marketing, referring to a paid search market for a predetermined commercial search engine market segment, referring to a group of individuals with similar characteristics The social commerce marketplace system then uses the preceding goals, selected list of keywords, and opportunity scores in step 1638 to determine the estimated traffic and related SEO elements (e.g., the number of backlinks links, etc.) required to reach the financial goals of the online store. Then, in step 1640, the social commerce marketplace system calculates the estimated difficulty of achieving the financial goals, which provides the store owner the information required to make a decision if they should include the product within their online store. In one embodiment, the financial goal information provided in step 1634 is presented to the online store owner to show the potential financial opportunity by market segment. It will be appreciated that such information would assist the online store owner in focusing and aligning their marketing efforts to those market segments that represent the greatest financial opportunities.

The product is then saved to the online store and its corresponding product details page is published to the online store's website in step 1642, followed by a determination being made in step 1644 whether to continue SEO goal attainment operations. If so, then the process is continued, proceeding with step 1604. Otherwise, SEO goal attainment operations are ended in step 1644.

Figure 17:
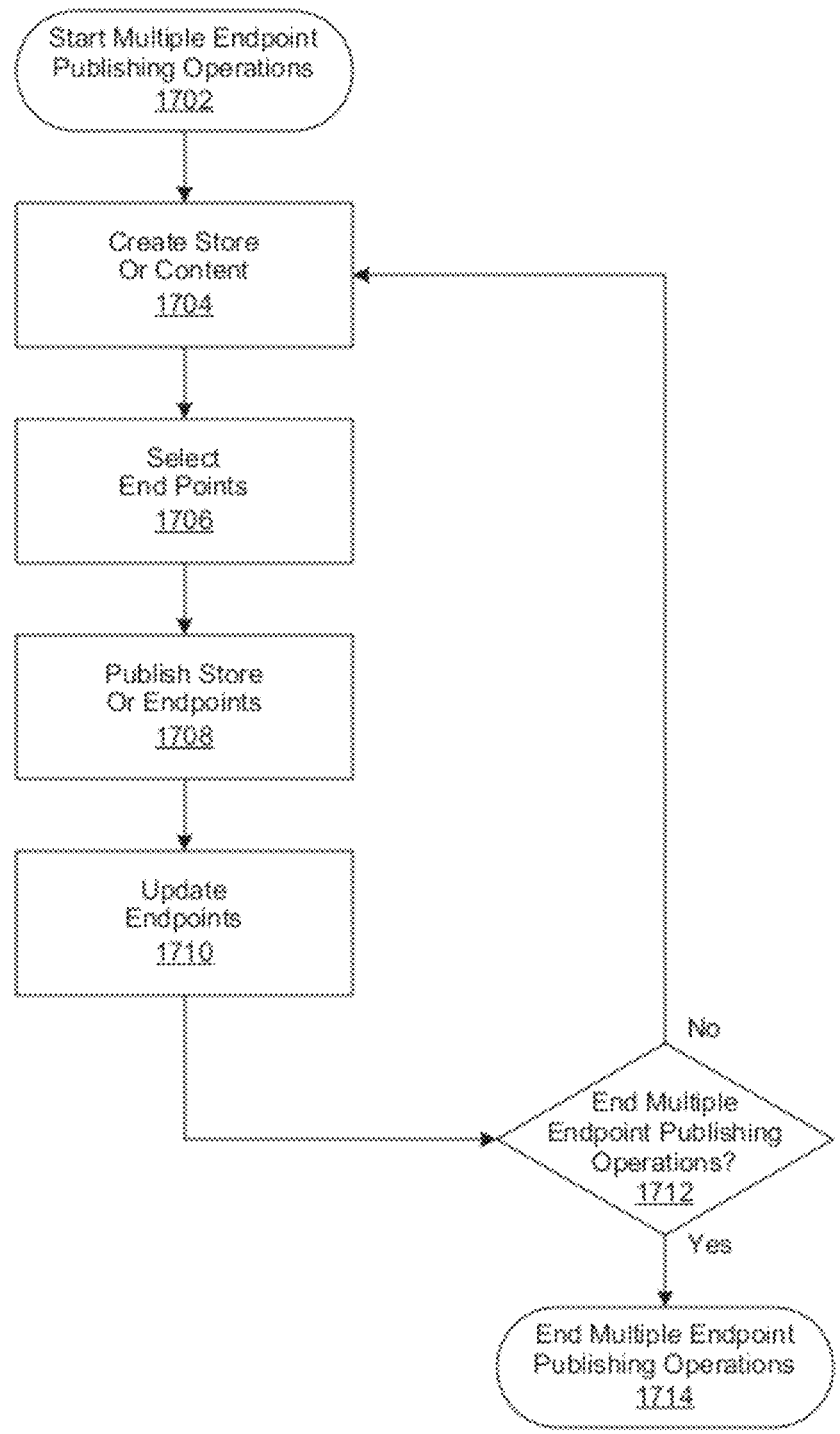
FIG. 17 is a generalized flowchart of the performance of multiple endpoint publication operations.

FIG. 17 is a generalized flowchart of the performance of multiple endpoint publication operations as implemented in accordance with an embodiment of the invention. In various embodiments, when a store catalog is created from one or more merchant catalogs by a user, they have the ability to publish the catalog and custom content within multiple distributed end points, such as various user interfaces on the web described in greater detail herein. In these and other embodiments, any changes (e.g., add, change, delete, etc.) to the store catalog or store content are automatically reflected across multiple locations on the internet.

In this embodiment, multiple endpoint publishing operations are begun in step 1702, followed by the creation of an online store or online store content in step 1704. In various embodiments, a user can create multiple stores, which in turn comprise their own store catalog, or additional content associated with an online store. In these and other embodiments, the social commerce marketplace system maintains a central reference of the store, and its associated content, so it can be reused across multiple publishing end points. Then, in step 1706, the user (e.g., the online store owner) selects one or more end points to publish the storefront, which is a UI representation of a store catalog, and may include:

a storefront within the social commerce marketplace system an online store within a social network environment a widget embedded in third party site a storefront embedded within another merchant's website a mobile device application an HTML-email-embedded store an API or catalog feed a kiosk a personal video recorder (PVR)-embedded store Endpoints are then automatically updated or published in step 1708. In one embodiment, all endpoints are automatically updated. In another embodiment only predetermined endpoints are updated. It will be appreciated that the ability to selectively choose which content to present on each end point is advantageous to the user (e.g., an online store owner). In various embodiments, the social commerce marketplace system provides users the ability to manually publish or push changes to each end point, or alternatively, configure the system to automatically publish the updates. In view of the foregoing, those of skill in the art will recognize that multiple versions of the content can be published to an end point. In various embodiments, the user configures the default version to display and the social commerce marketplace system selects the appropriate alternative version to display based on the user's intent and context. For example, a single store can have two notions of the catalog; one for men and one for women. If the visitor is identified as a female, the system obfuscates the products specific to the male gender and only presents products made for the female gender.

Once a publishing event has been completed, the store or content changes are updated in step 1710 and made available to visitors within each respective end point. A determination is then made in step 1712 whether to end multiple endpoint publishing operations. If not, then the process is continued, proceeding with step 1704. Otherwise, endpoint publishing operations are ended in step 1714.

Figure 18A:
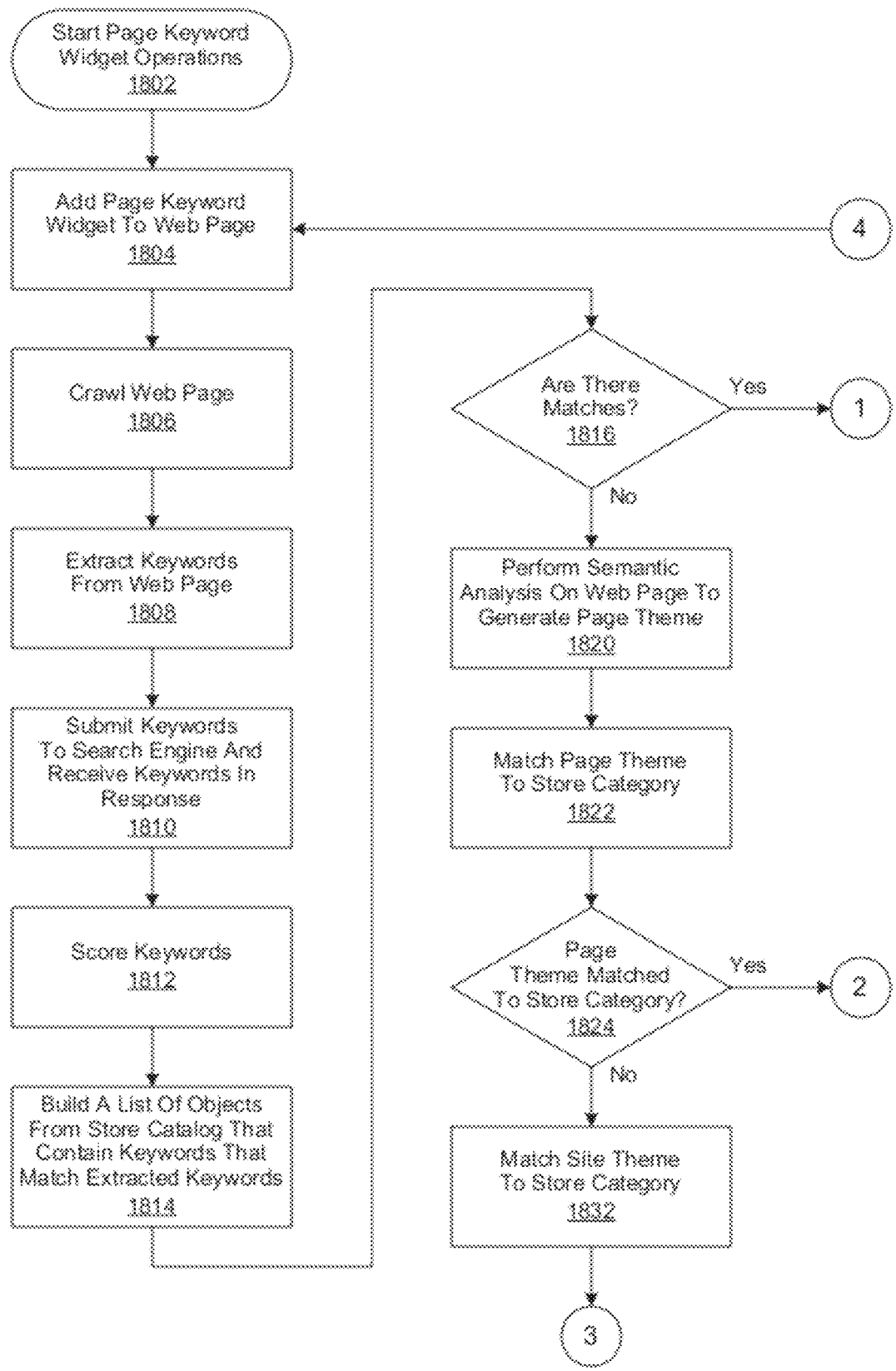
FIGS. 18a-b are a generalized flow chart of the performance of page keyword widget operations.
Figure 18B:
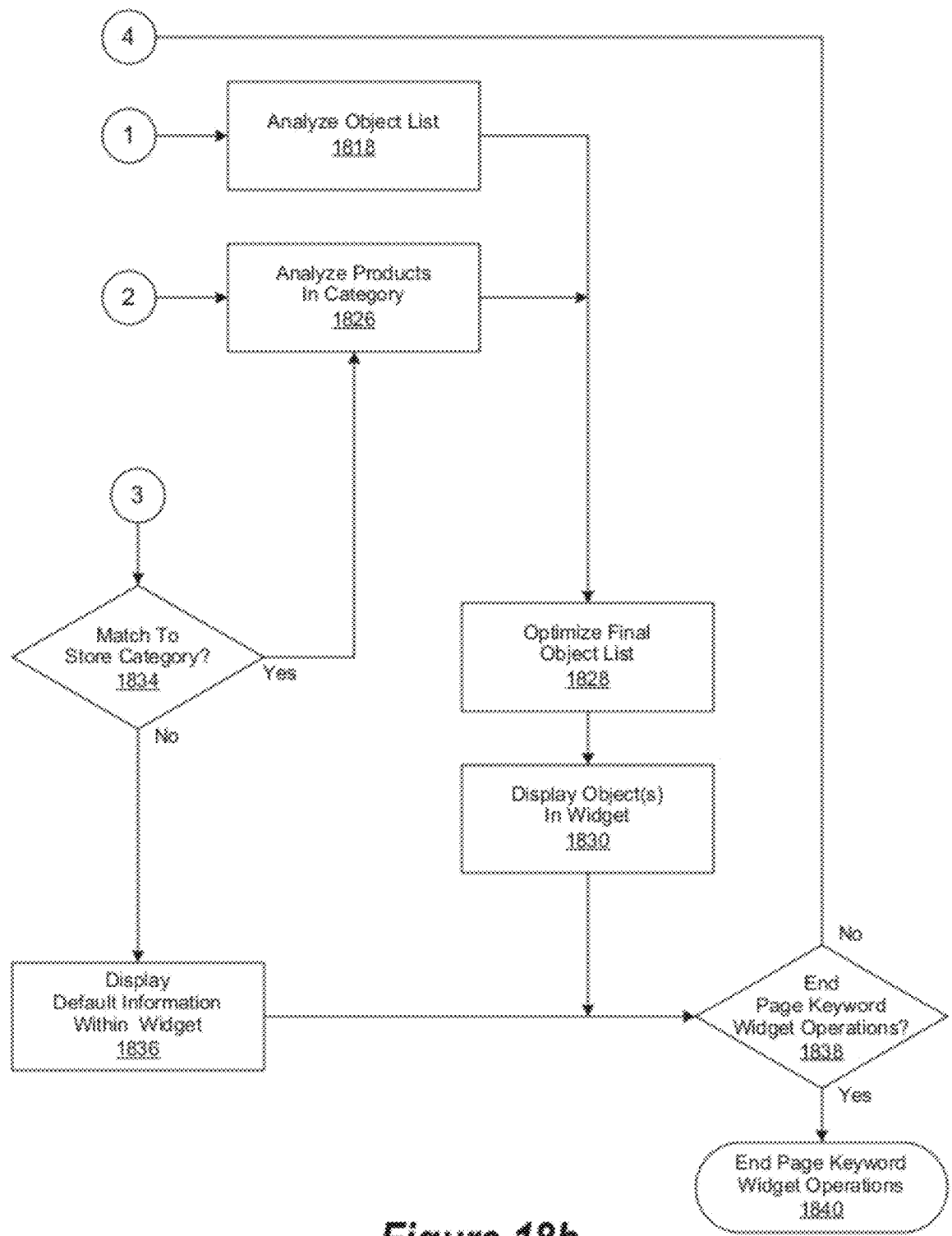

FIGS. 18*a-b* are a generalized flow chart of the performance of page keyword widget operations as implemented in accordance with an embodiment of the invention. In various embodiments, a page keyword recommendation widget is implemented to evaluate the content of a host page. In these and other embodiments, the page keyword recommendation widget extracts keywords that are then used by the widget to make dynamic real-time recommendations of objects (e.g., products, offers, deals, videos, images, marketing information, etc.) that contain keywords that match those extracted from the host page. Dynamically matching widget content based on the context of the page keywords helps to ensure the widget content matches the interests of the visitor.

In this embodiment, page keyword operations are begun in step 1802, followed by the addition of a page keyword widget to a target web page in step 1804. In one embodiment, a user logs into the social commerce marketplace system and navigates to a list of widgets to identify a desired page keyword widget. Once it is identified, the user accesses an appropriate host site, opens a target page's HTML code, and inserts the widget's embedded code. The web page is then saved and republished, making it active and available for rendering.

A crawler application familiar to those of skill in the art is then used in step 1806 to crawl the target web page. In one embodiment, the web page is crawled proactively. In this embodiment, when a page keyword widget is configured by a user in the system, they will have the option to define a list of known Uniform Resource Locators (URLs) where the widget will be embedded. When the widget is published, the system dispatches a crawler to the URL and indexes the page's full HTML. In another embodiment the target web page is crawled reactively. In this embodiment, if a page keyword widget is embedded into a page that was not configured with a predefined URL to crawl, then the social commerce marketplace system dispatches a crawler to the page's URL and indexes the page's full HTML the first time the widget is loaded and rendered within the system.

In various embodiments, the crawler application reads the page's full HTML and saves it to the social commerce marketplace platform for later processing. In these and other embodiments, the page's HTML may include:
title meta tag contents
description meta tag contents
keywords meta tag contents
author meta tag contents
page body text
H1 through H3 text
links
link title text
Alt image tag text Each time the page keyword widget is loaded, it re-indexes the host page's HTML to determine whether the page content has changed since the last keyword analysis process was performed. If there has not been a change, the page keyword widget will use the keywords and matching analysis already saved in the social commerce marketplace system. If the page title, description meta tag content, keywords meta tag content, or page body text has changed, then the social commerce marketplace system will repeat step 1806, and subsequent steps as necessary, to ensure that the widget contents are always optimized for the host page.

Then, in step 1808, keywords are extracted from the web page HTML code that was acquired by the crawler in step 1806. In one embodiment, a semantic entity and keyword extraction process is performed on the HTML code to extract key topics, people, places and nouns from text objects. In another embodiment, sentiment analysis is performed on the HTML code to determine the tone and strength of tone from text objects. In this embodiment, analyzed text objects are assigned a tone indicator (e.g., positive, neutral, or negative) and a numeric score that represents the relative strength of the tone indicator.

Likewise, the social commerce marketplace system extracts keyword entities from HTML elements such as:
title meta tag contents
description meta tag contents
keywords meta tag contents
page Body text
H1 through H3 text The extracted keyword entities are then associated with the URL of the web page and then stored in the social commerce marketplace system for later processing.

Keywords are then submitted to one or more search engines in step 1810 and associated keywords are received in return to create a larger pool of keywords. In one embodiment, a keyword referral analysis is performed by submitting the web page's URL to one or more search engines (e.g., Google®, Blekko®, etc.) to retrieve the top keyword referrals to the page over a predetermined time interval (e.g., the past 30 days). The social commerce marketplace system then associates these keywords to the web page's URL and stores them in the system. In another embodiment, extracted keyword analysis is performed by submitting the keywords extracted from the web page to one or more search engines to get the top-related keyword searches corresponding to those terms according to search frequency and competition. The social commerce marketplace system then associates these keywords to the web page's URL and stores them in the system.

The extracted keywords are then scored in step 1812 and assigns points based on the source of the keywords. In various embodiments, the relative score values by source may include:
highest value extracted keywords
  page title
  description meta tag
  keywords meta tag
next highest value keywords
  page body keywords
  search engine referral keywords
  search engine advertising keywords Then, in step 1814, the social commerce marketplace system builds a list of objects (e.g., products, offers, deals, etc.) from a store catalog that contain one or more keywords that match the keywords extracted from the web page. As used herein, a store catalog broadly refers to a subset of a master catalog of objects that are available for presentation on the web page. Accordingly, the resulting list of objects becomes the group of possible objects to display in the page keyword widget.

A determination is then made in step 1816 whether any of the objects from the store catalog match the extracted keywords. If so, then the social commerce marketplace system performs a series of analyses on the objects within the store catalog in step 1818 to optimize the selection of which products to display in the page keyword widget and in what order. In one embodiment, exclusion rules are defined in the page keyword widget that exclude predetermined objects from being displayed. In this and other embodiments, the exclusion rules include:
Gender Target—the gender of the visitor does not match the target gender of the product
Previously Purchased—the object has been previously purchased by the visitor
Brand Sentiment—if the visitor has a known negative sentiment about the brand or product
Margin—if the product does not meet or exceed specific margin targets
Quantity—if the merchant does not currently have the item in stock
Blacklisted Products—specific products or category of products the user does not want to present In another embodiment, behavioral analysis operations are performed to automate the ranking and prioritization of displayed products based on:
previous visitor click through rates
previous visitor purchase rates
segments that can be defined or tracked by a web analytics tool or that can be defined by the social commerce marketplace system for the user (e.g., geo-location, time of day, new vs. existing customers, repeat visitor, etc.)
Click Through Rate (CTR) for visitor's segment that can be defined or tracked by a web analytics tool or that can be defined by the social commerce marketplace system for the user (e.g., geo-location, time of day, new vs. existing customers, repeat visitor, etc.)
average order value for click through ratings and reviews of products
number and value of previous brand impressions for the visitor
CTR for visitor social score
Third Party Analytics Clickstream & Segment Information In these various embodiments, the behavioral analysis can be based on different populations of users, such as:
visitors to a predetermined social commerce site
visitors to a predetermined merchant site
all social commerce sites visited by a predetermined visitor
all social commerce sites However, if it is determined in step 1816 that there are no matching keywords, then the social commerce marketplace system performs semantic analysis operations on the contents and topics of the web page in step 1820 to generate a webpage theme. The resulting web page theme is then matched to the store catalog's categories in step 1822 to build a list of catalog categories that can then be used to display products in the page keyword widget.

A determination is then made in step 1824 whether the web page theme was successfully matched to the store catalog categories. If so, then the social commerce marketplace system performs a series of analysis operations on the objects within the store catalog category to optimize the selection of which objects (e.g., products) to display in the page keyword widget and in which order. In one embodiment, exclusion rules are defined in the page keyword widget that excludes predetermined objects from being displayed. In this and other embodiments, the exclusion rules include:
Gender Target—the gender of the visitor does not match the target gender of the product
Previously Purchased—the object has been previously purchased by the visitor
Brand Sentiment—if the visitor has a known negative sentiment about the brand or product
Margin—if the product does not meet or exceed specific margin targets
Quantity—if the merchant does not currently have the item in stock In another embodiment, behavioral analysis operations are performed to automate the ranking and prioritization of displayed products based on:
previous visitor click through rates
previous visitor purchase rates
segments that can be defined or tracked by a web analytics tool or that can be defined by the social commerce marketplace system for the user (e.g., geo-location, time of day, new vs. existing customers, repeat visitor, etc.)
CTR for visitor's segment that can be defined or tracked by a web analytics tool or that can be defined by the social commerce marketplace system for the user (e.g., geo-location, time of day, new vs. existing customers, repeat visitor, etc.)
average order value for click through
ratings and reviews of products
number and value of previous brand impressions for the visitor
CTR for visitor social score
3rd Party Analytics Clickstream & Segment Information In these various embodiments, the behavioral analysis can be based on different populations of users, such as:
visitors to a predetermined social commerce site
visitors to a predetermined merchant site
all social commerce sites visited by a predetermined visitor
all social commerce sites Once the analysis operations are completed in step 1818 or step 1826, a final list of objects (e.g., products) is optimized in step 1828. In various embodiments, the optimized list determines the order in which objects are presented, their respective discount, and UI theme to apply to each object to optimize the likelihood the visitor will take an action within the widget. As an example, the optimization may incent a user to click-through on a specific call to action (e.g., review a product, offer, or deal). The optimized list of objects is then displayed within the page keyword widget in step 1830, followed by a determination being made in step 1838 whether to end page keyword widget operations. If not, then the process is continued, proceeding with step 1804. Otherwise, page keyword widget operations are ended in step 1840.

However, if it is determined in step 1824 that the web page theme was not successfully matched to the store catalog categories, then the social commerce marketplace system submits the page's domain to a search engine and retrieves its assigned category. The retrieved category is then matched in step 1832 to the store catalog's categories to build a list of catalog categories that can then be used to display products in the page keyword widget. A determination is then made in step 1834 whether the web page theme was successfully matched to the list of store catalog categories. If so, then the process is continued, proceeding with step 1826. Otherwise, default information is displayed within the keyword page widget in step 1836, followed by a determination being made in step 1838 whether to end page keyword widget operations. If not, then the process is continued, proceeding with step 1804. Otherwise, page keyword widget operations are ended in step 1840.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for managing catalog resources in a social commerce environment, the social commerce environment comprising a social commerce marketplace system executing on a hardware processor of an information handling system and a plurality of affiliate networks, comprising:

receiving social data associated with a user, the social data provided by an affiliate via an affiliate network of the plurality of affiliate networks, the affiliate having a corresponding social commerce storefront embedded within a social media site;

processing, via the social commerce marketplace system, catalog data associated with a set of available products to identify a subset of available products corresponding to the affiliate, the subset of available products comprising a set of purchasable products;

processing, via the social commerce marketplace system, the social data and catalog data associated with the set of purchasable products to generate product catalog data, the product catalog data being consolidated into batches for processing, the processing facilitating managing catalog resources in a social commerce environment via an information handling system;

providing the product catalog data to the user via the social commerce storefront, the social commerce storefront comprising social commerce content associated with at least some of the set of purchasable products, the social commerce storefront comprising an affiliate storefront management module, the affiliate storefront management module managing the social commerce storefront, the managing comprising receiving social commerce recommendation data and using the social commerce recommendation data to display a representation of a product corresponding to the social commerce recommendation data, the product corresponding to the social commerce recommendation data being selected from the set of purchasable products, the managing further comprising enabling users to purchase the product associated with the social commerce recommendation data; wherein, the processing catalog data associated with a set of available products is performed via a first user interface, the first user interface presenting a representation of the set of available products and enabling a user to identify a subset of available products corresponding to the affiliate.

2. The computer-implementable method of claim 1, wherein the product catalog data corresponds to a subset of the purchasable products.

3. The computer-implementable method of claim 1, wherein the product catalog data is processed to generate widget data, wherein the widget data is provided within a user interface window by a widget.

4. The computer-implementable method of claim 1, wherein:

the social data is processed to generate social graph data;

the social graph data is processed via a social graph management module to generate keyword data and theme data, the social graph management module retrieving visitor social data and social relationship data, the social graph management module providing the visitor social data and social relationship data to a recommendation engine management module, the recommendation engine management module determining which content to present to the user to increase user engagement;

the keyword data and the theme data is processed to identify a subset of the product catalog data; and the subset of the product catalog data is provided to the user.

5. The computer-implementable method of claim 1, wherein the product catalog data is associated with a campaign.

6. The computer-implementable method of claim 1, wherein:

the product catalog data is associated with social commerce content data; and the social commerce content data is concurrently provided to the user with the product catalog data.

7. A system comprising:

a processor;

a data bus coupled to the processor; and a computer-usable medium embodying computer program code for managing catalog resources in a social commerce environment, the social commerce environment comprising a social commerce marketplace system executing on a hardware processor of an information handling system and a plurality of affiliate networks, the computer-usable medium being coupled to the data bus, the computer program code interacting with a plurality of computer operations and comprising instructions executable by the processor and configured for:

receiving social data associated with a user, the social data provided by an affiliate via an affiliate network of the plurality of affiliate networks, the affiliate having a corresponding social commerce storefront embedded within a social media site;

processing, via the social commerce marketplace system, catalog data associated with a set of available products to identify a subset of available products corresponding to the affiliate, the subset of available products comprising a set of purchasable products;

processing, via the social commerce marketplace system, the social data and catalog data associated with the set of purchasable products to generate product catalog data, the product catalog data being consolidated into batches for processing, the processing facilitating managing catalog resources in a social commerce environment via an information handling system;

providing the product catalog data to the user via the social commerce storefront, the social commerce storefront comprising social commerce content associated with at least some of the set of purchasable products, the social commerce storefront comprising an affiliate storefront management module, the affiliate storefront management module managing the social commerce storefront, the managing comprising receiving social commerce recommendation data and using the social commerce recommendation data to display a representation of a product corresponding to the social commerce recommendation data, the product corresponding to the social commerce recommendation data being selected from the set of purchasable products, the managing further comprising enabling users to purchase the product associated with the social commerce recommendation data; wherein, the processing catalog data associated with a set of available products is performed via a first user interface, the first user interface presenting a representation of the set of available products and enabling a user to identify a subset of available products corresponding to the affiliate.

8. The system of claim 7, wherein the product catalog data corresponds to a subset of the purchasable products.

9. The system of claim 7, wherein the product catalog data is processed to generate widget data, wherein the widget data is provided within a user interface window by a widget.

10. The system of claim 7, wherein the social data is processed to generate social graph data;

the social graph data is processed via a social graph management module to generate keyword data and theme data, the social graph management module retrieving visitor social data and social relationship data, the social graph management module providing the visitor social data and social relationship data to a recommendation engine management module, the recommendation engine management module determining which content to present to the user to increase user engagement;

the keyword data and the theme data is processed to identify a subset of the product catalog data; and the subset of the product catalog data is provided to the user.

11. The system of claim 7, wherein the product catalog data is associated with a campaign.

12. The system of claim 7, wherein:

the product catalog data is associated with social commerce content data; and the social commerce content data is concurrently provided to the user with the product catalog data.

13. A non-transitory computer-usable medium embodying computer program code for managing catalog resources in a social commerce environment, the social commerce environment comprising a social commerce marketplace system executing on a hardware processor of an information handling system and a plurality of affiliate networks, the computer program code comprising computer executable instructions configured for:

receiving social data associated with a user, the social data provided by an affiliate via an affiliate network of the plurality of affiliate networks, the affiliate having a corresponding social commerce storefront embedded within a social media site;

processing, via the social commerce marketplace system, catalog data associated with a set of available products to identify a subset of available products corresponding to the affiliate, the subset of available products comprising a set of purchasable products;

processing, via the social commerce marketplace system, the social data and catalog data associated with the set of purchasable products to generate product catalog data, the product catalog data being consolidated into batches for processing, the processing facilitating managing catalog resources in a social commerce environment via an information handling system;

providing the product catalog data to the user via the social commerce storefront, the social commerce storefront comprising social commerce content associated with at least some of the set of purchasable products, the social commerce storefront comprising an affiliate storefront management module, the affiliate storefront management module managing the social commerce storefront, the managing comprising receiving social commerce recommendation data and using the social commerce recommendation data to display a representation of a product corresponding to the social commerce recommendation data, the product corresponding to the social commerce recommendation data being selected from the set of purchasable products, the managing further comprising enabling users to purchase the product associated with the social commerce recommendation data; wherein, the processing catalog data associated with a set of available products is performed via a first user interface, the first user interface presenting a representation of the set of available products and enabling a user to identify a subset of available products corresponding to the affiliate.

14. The computer usable medium of claim 13, wherein the product catalog data corresponds to a subset of the purchasable products.

15. The computer usable medium of claim 13, wherein the product catalog data is processed to generate widget data, wherein the widget data is provided within a user interface window by a widget.

16. The computer usable medium of claim 13, wherein:

the social data is processed to generate social graph data;

the social graph data is processed via a social graph management module to generate keyword data and theme data, the social graph management module retrieving visitor social data and social relationship data, the social graph management module providing the visitor social data and social relationship data to a recommendation engine management module, the recommendation engine management module determining which content to present to the user to increase user engagement;

the keyword data and the theme data is processed to identify a subset of the product catalog data; and the subset of the product catalog data is provided to the user.

17. The computer usable medium of claim 13, wherein the product catalog data is associated with a campaign.

18. The computer usable medium of claim 13, wherein:

the product catalog data is associated with social commerce content data; and the social commerce content data is concurrently provided to the user with the product catalog data.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *